United States Patent [19]
Tanaka et al.

[11] Patent Number: 6,147,781
[45] Date of Patent: Nov. 14, 2000

[54] FACSIMILE APPARATUS CAPABLE OF REMOVING A STACK OF RECORDING SHEETS THAT HAVE BEEN EJECTED

[75] Inventors: Shuuji Tanaka, Kanagawa-ken; Yasunobu Youda, Sagamihara; Yasuhiro Kawashima, Atsugi, all of Japan

[73] Assignee: Ricoh Company, Ltd., Tokyo, Japan

[21] Appl. No.: 09/061,250

[22] Filed: Apr. 17, 1998

[30] Foreign Application Priority Data

| Apr. 18, 1997 | [JP] | Japan | 9-100697 |
| Jun. 20, 1997 | [JP] | Japan | 9-180654 |
| Jul. 24, 1997 | [JP] | Japan | 9-198683 |
| Feb. 3, 1998 | [JP] | Japan | 10-022230 |

[51] Int. Cl.⁷ ........................... H04N 1/04
[52] U.S. Cl. ................. 358/498; 358/474
[58] Field of Search .................. 358/498, 474, 358/413, 412, 400, 405, 419, 443, 468, 472, 486, 444, 442, 439, 438, 437, 436

[56] References Cited

U.S. PATENT DOCUMENTS

| 5,128,762 | 7/1992 | Muramatsu | 358/296 |
| 5,173,785 | 12/1992 | Muramatsu | 358/400 |
| 5,923,436 | 7/1999 | Fuchi | 358/400 |
| 5,982,510 | 11/1999 | Funahashi | 358/468 |

*Primary Examiner*—Jerome Grant, II
*Assistant Examiner*—Negussie Worku
*Attorney, Agent, or Firm*—Oblon, Spivak, McClelland, Maier & Neustadt, P.C.

[57] ABSTRACT

A data transmission and receiving apparatus capable of removing a stack of recording sheets that have been ejected. The apparatus includes an image recording mechanism that records an image on a recording sheet, an ejection mechanism that ejects a recording sheet recorded by the image recording mechanism, a sheet tray that accommodates the recording sheet ejected by the ejection mechanism, and a sheet conveyer that is mounted underneath the ejection mechanism and over the sheet tray. The sheet conveyer includes a pair of frames, a plurality of foot members mounted on the bottom surface of the pair of frames, and a sheet conveying mechanism held for rotation between the pair of frames. The sheet conveying mechanism includes a belt that conveys the recording sheet ejected by the ejection mechanism, a drive roller that drives the belt, and an idle roller. The sheet conveyer further includes a drive member that drives the drive roller of the sheet conveying mechanism and a power supply source that applies a power to the drive member.

34 Claims, 17 Drawing Sheets

FACSIMILE APPARATUS CAPABLE OF REMOVING A STACK OF RECORDING SHEETS THAT HAVE BEEN EJECTED

BACKGROUND OF THE INVENTION

1. Field of the Invention

This invention relates to a facsimile apparatus, and more particularly to a facsimile apparatus capable of removing a stack of recording sheets that have been ejected.

2. Description of the Related Art

Saving space is an important concept in designing an office apparatus, in particular when an apparatus is expected to be installed in a busy space. One example of such an office apparatus is a so-called wing-less type facsimile apparatus. In a usual facsimile apparatus, sheet containers such as paper trays, for example, are normally mounted on the body of the apparatus in such a way that the sheet containers protrude from the body of the apparatus, as wings. Accordingly, a footprint of such sheet containers normally protrudes from the footprint of the body of the apparatus and a total footprint of the apparatus becomes larger. This may cause a space problem in an office environment, for example. The wing-less type facsimile apparatus has resolved this problem by arranging sheet containers in a position where a footprint of the sheet containers does not protrude from the footprint of the body of the apparatus. However, in general, the wing-less type facsimile apparatus has a relatively narrow space for accommodating printed sheets which are produced by the apparatus. Therefore, when a relatively large number of printed sheets are produced without removing them from time to time, the apparatus may cause a jam of the printed sheets due to the narrow space which can accommodate a limited number of sheets. This may occur in a case, for example, when an apparatus is located in an office which is closed for a holiday and the apparatus receives a large amount of data to print without an attendant available.

FIG. 21 illustrates a typical example of the wing-less type facsimile apparatus 1. The apparatus 1 includes a photoconductive drum 2 for forming an electrostatic latent image on a surface thereof, a cleaner 3 for cleaning the surface of the photoconductive drum 2, a charger 4 for charging the whole surface of the photoconductive drum 2 at a uniform voltage level, and a laser writing unit 5 for generating a laser beam to write an image on the surface of the photoconductive drum 2. The apparatus 1 further includes a development unit 6 for developing an electrostatic latent image in a visual image with toner, a toner magazine 7 for supplying toner to the development unit 6, a transfer roller 8 that is in contact with the surface of the photoconductive drum 2, and a fixing unit 9 that includes pressure and heat rollers. The apparatus 1 further includes a sheet cassette 10 that is detachably mounted on the apparatus and contains a plurality of recording sheets P, a pair of transferring rollers 11 for transferring a recording sheet P along a sheet passage, and a pair of registration rollers 12 for transferring a recording sheet P at a time relative to a rotation of the photoconductive drum 2 in an image forming process. The apparatus 1 further includes a pair of ejection rollers 13 for ejecting the recording sheet P to an outside of the apparatus 1, a sheet-eject detect sensor 14 that is located before the ejection rollers 13 and which detects the recording sheet P, a first outlet tray 15 formed at an upper surface of the apparatus 1 and which accommodates the recording sheet P ejected by the ejection rollers 13, and a sheet roller 16 for forwarding the recording sheet P to the transferring rollers 11. The apparatus 1 further includes a scanner 20 that reads an image and generates an image signal, an inlet tray 21 for accommodating a plurality of original sheets, an image reading sensor 22 for reading an image of an original sheet, and a second outlet tray 23 for accommodating an original sheet after a completion of the reading operation by the scanner 20.

In the above-mentioned wing-less type facsimile apparatus 1, an operation for outputting an image onto the recording sheet P is performed in the following way. When the apparatus 1 receives a call signal via a telephone line switching system, the telephone line is closed and a control section (not shown) of the apparatus 1 is linked to a call originating machine over the telephone line. Then, the controller section of the apparatus 1 receives an image signal from the call originating machine in accordance with predetermined protocols and stores data of the received image signal into an image memory. Then, an amount of data of the received image signal that corresponds to one page of a recording sheet is read from the image memory and loaded to a page memory. Based on the page data stored in the page memory, the control section of the apparatus 1 generates a drive signal for driving the laser writing unit 5.

Further, in the image outputting operation, the control section of the apparatus 1 has the photoconductive drum 2 rotated in the direction indicated by an arrow in the drawing and charged at a predetermined voltage level with the charger 4, upon a start of receiving an image signal. The laser writing unit 5 is driven by the drive signal from the control section to generate a laser beam that corresponds to the image signal. By irradiation with the laser beam from the writing unit 5, the photoconductive drum 2 forms an electrostatic latent image on the surface thereof.

The toner magazine 7 supplies toner to the development unit 6 with a timing of a rotational movement of the photoconductive drum 2. The supplied toner is forwarded to a development roller (not shown) which is included in the development unit 6 and flattened on a surface of the development roller. Then, the toner on the development roller is selectively attracted to the electrostatic latent image formed on the surface of the photoconductive drum 2 so as to visualize the image with toner. The visualized image with toner is referred to as a toner image.

Further, in the image outputting operation, the sheet roller 16 rotates to retrieve one recording sheet P from the sheet cassette 10 and to transfer the sheet P to the transferring rollers 11. Then, the transferring rollers 11 transfer the recording sheet P to the registration rollers 12. The transferred recording sheet P stops when the top edge of the sheet P impinges on a region where the registration rollers 12 are in contact with each other. The registration rollers 12 restart the transfer of the recording sheet P at a time when a top portion of the image on the photoconductive drum 2 reaches a predetermined region. When the recording sheet P passes between the photoconductive drum 2 and the transfer roller 8 and reaches a predetermined position, the toner image is transferred from the photoconductive drum 2 to the transfer roller 8.

The image-transferred recording sheet P is separated from the photoconductive drum 2 with separation pawls (not shown) or the like and transferred to the fixing unit 9. The fixing unit 9 applies pressure and heat to the toner image so as to fix the image onto the recording sheet P. Then, the image-fixed recording sheet P is ejected from the inside of the apparatus 1 to the first outlet tray 15 by the ejection rollers 13.

Further, in the image outputting operation, the control section of the apparatus 1 transfers the next page data stored in the image memory into the page memory so that another cycle of the above-described image forming operation may be performed. The control section repeats this page data transfer from the image memory to the page memory until all the images in accordance with the received image signal are output onto the recording sheets P through the repeated cycles of the image outputting operation. After all the images have been output in this way, the recording sheets P ejected by the ejection rollers 13 are stacked upon the first outlet tray 15.

In the thus-arranged wing-less type facsimile apparatus 1, the first outlet tray 15, the second outlet tray 23, and the inlet tray 21 are designed to not protrude from the body of the apparatus 1 so as to not enlarge a footprint of the apparatus 1, and thus meet the requirements of saving space.

However, as described above, the aforementioned wing-less type facsimile apparatus may cause a paper jam problem due to its relatively narrow space for accommodating printed sheets when a relatively large amount of printed sheets are produced without removing them from time to time, in a case, for example, when the apparatus in an office which is closed for a holiday receives a large amount of data to print and an attendant is not available.

For example, JPAP07-203118 discloses a facsimile apparatus which has a plurality of sheet trays and controls to eject recording sheets to other sheet trays when a jam is caused in the present sheet tray.

Further, for example, JPAP08-277055 discloses a copying apparatus which has a fan for preventing paper jams around a sheet ejection mechanism.

However, these disclosures do not solve the problem of the wing-less type facsimile apparatus having one sheet tray for receiving an ejected recording sheet and a limited space for stacking the ejected recording sheet.

At present, there is no such facsimile apparatus that has a relatively small footprint and that is capable of removing a stack of recording sheets that have been ejected.

SUMMARY OF THE INVENTION

Accordingly, an object of the present invention is to provide a novel facsimile apparatus which is capable of removing a stack of recording sheets that have been ejected.

A novel facsimile apparatus according to the present invention includes an image recording mechanism that records an image on a recording sheet, an ejection mechanism that ejects a recording sheet recorded by the image recording mechanism, a sheet tray that accommodates the recording sheet ejected by the ejection mechanism, and a sheet conveyer that is mounted underneath the ejection mechanism and over the sheet tray. The sheet conveyer includes a pair of frames, a plurality of foot members mounted on a bottom surface of the pair of frames, and a sheet conveying mechanism for rotation between the pair of frames. The sheet conveying mechanism includes a belt that conveys the recording sheet ejected by the ejection mechanism, a drive roller that drives the belt, and an idle roller. The sheet conveyer further includes a drive member that drives the drive roller of the sheet conveying mechanism and a power supply source that applies a power to the drive member.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
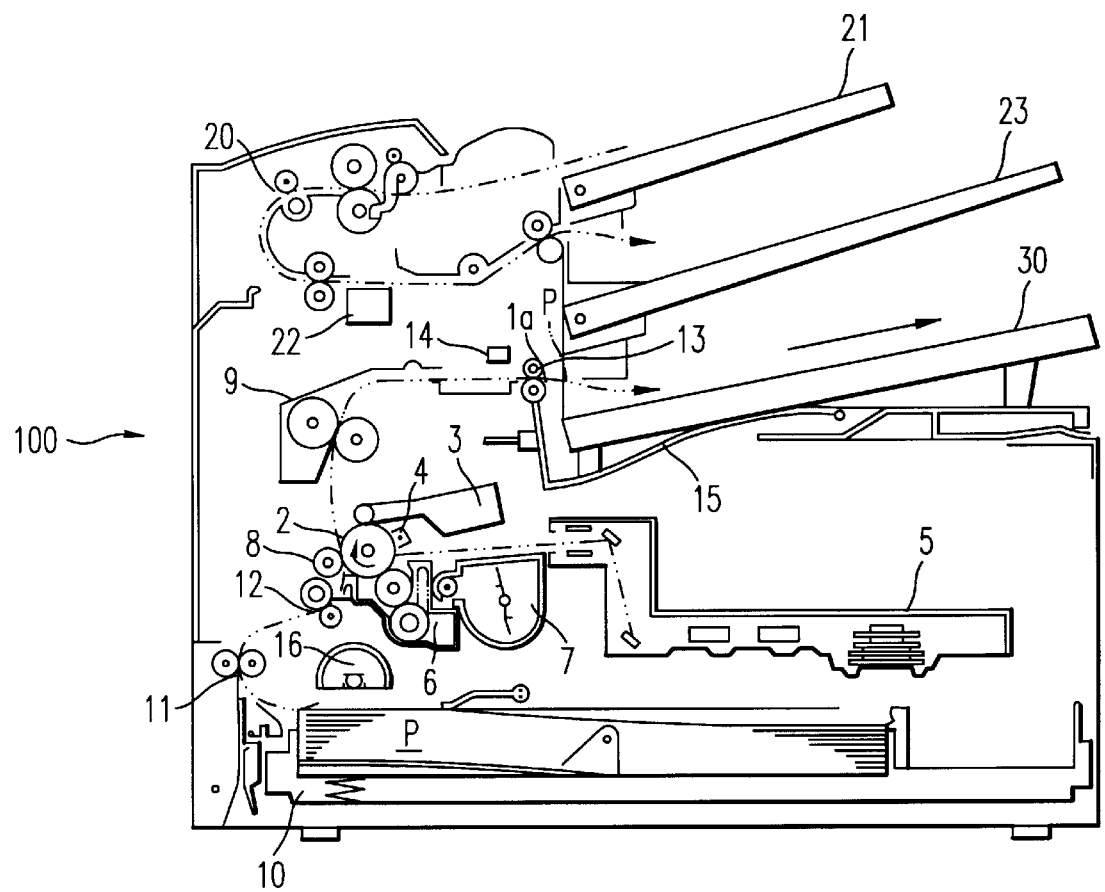
FIG. 1 illustrates a schematic internal side view of a facsimile apparatus as a first embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1 thereof, there is illustrated a structural side view of an exemplary wing-less type facsimile apparatus 100 as a first embodiment of the present invention.

Figure 21:
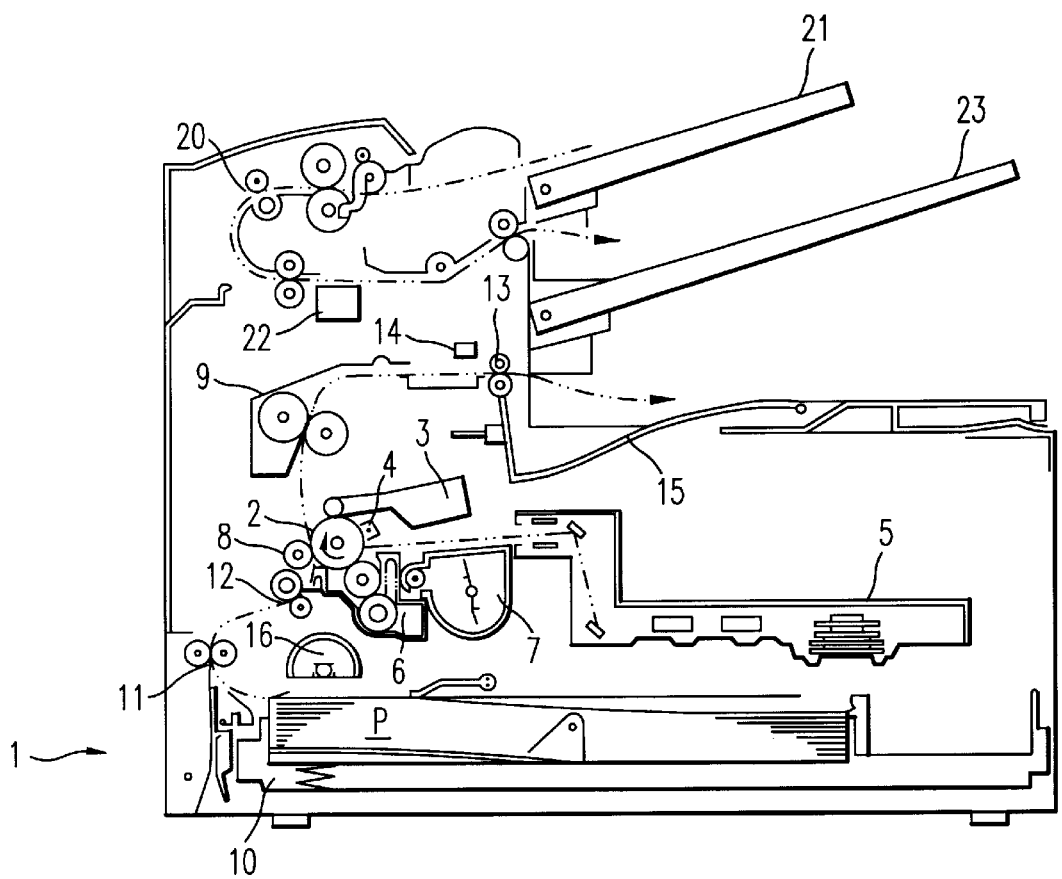
FIG. 21 is a schematic internal side view of a conventional facsimile apparatus.

The first embodiment, the wing-less type facsimile apparatus 100, includes elements that are similar to those of the above-described wing-less type facsimile apparatus 1. Therefore, in describing the first embodiment, an element which corresponds to the element described with reference to FIG. 21 is provided with the same reference numeral and the same description for this element is omitted.

In the first embodiment, a sheet ejection mechanism that ejects a recording sheet P output by the apparatus 100 includes an ejection opening 1a for ejecting an output recording sheet P to an outside of the apparatus 100, the ejection rollers 13, and a sheet conveyer 30 that receives the output recording sheet P ejected through the ejection opening 1a and transfers the output recording sheet P in a predetermined direction. The sheet conveyer 30 is detachably mounted on the first outlet tray 15.

Figure 2:
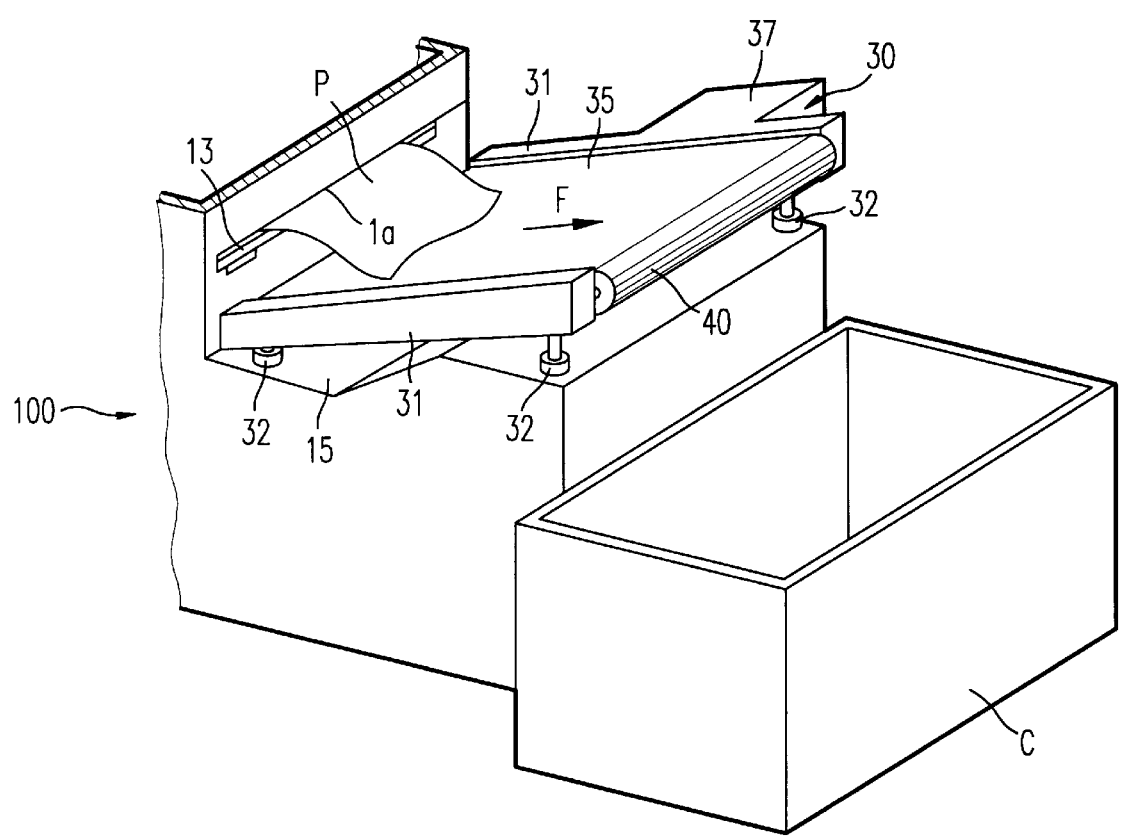
FIG. 2 illustrates a sheet conveyer and associated portions of the first embodiment of FIG. 1.
Figure 3:
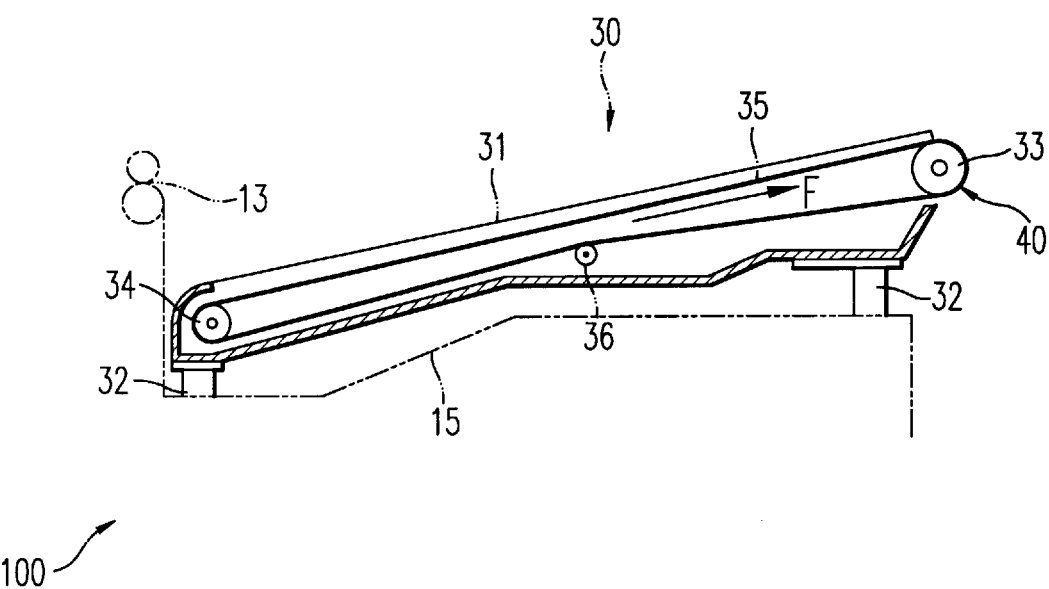
FIG. 3 illustrates a schematic internal side view of the sheet conveyer illustrated in FIG. 2.

As illustrated in FIGS. 2 and 3, the sheet conveyer 30 includes a pair of frame members 31 for supporting the elements constituting the sheet conveyer 30, and supporting feet 32 that are mounted under each of the frame members 31 at each corner of the sheet conveyer 30. The sheet conveyer 30 further includes a drive roller 33 (FIG. 3) that is held for rotation at the front side of the sheet conveyer 30 and an idle roller 34 (FIG. 3) that is held for rotation at the rear side of the sheet conveyer 30. The sheet conveyer 30 further includes a transfer belt 35 that is an endless belt and runs over the drive roller 33 and the idle roller 34. The transfer belt 35 is made of a material having a relatively high coefficient of friction relative to the recording sheet P, including, for example, a material made with rubber. The drive roller 33, idle roller 34, and transfer belt 35 form a rotary mechanism 40, in the sheet conveyor 30, for transferring an ejected recording sheet P to the outside of the apparatus 100.

The sheet conveyer 30 further includes a belt tensioner 36 for applying a constant tension to the transfer belt 35 and a utility portion 37 that is molded together with one of the frame members 31 and that accommodates electrical components, for example.

The thus-arranged etachable sheet conveyer 30 is normally detached from the facsimile apparatus 100 and placed into use by being mounted on the first outlet tray 15. A particular case is when the facsimile apparatus 100 needs to operate without an attendant for a relatively long time period or to receive a relatively large amount of information in a relatively short time period.

The transfer belt 35 has a width wider than that of the recording sheet P on which the image of the original sheet is printed and also has a maximum width among other selectable recording sheets. In addition, the transfer belt 35 has a relatively long length so that a top end thereof overhangs from the first outlet tray 15, when being installed on the apparatus 100.

In the first embodiment with the sheet conveyer 30 installed in an operational position, when the drive roller 33 drives the transfer belt 35 in the direction indicated by an arrow with a letter F in the drawings, the output recording sheet P that has been ejected through the ejection opening 1a is transferred by the transfer belt 35 to the edge of the transfer belt 35 and then falls due to its own weight. Thus, the output recording sheet P is removed from a region where the ejected recording sheet P is stacked. Accordingly, a paper jam caused by the stack of the ejected recording sheets P may be avoided even when the facsimile apparatus 100 needs to operate without an attendant for a relatively long time period or needs to receive a relatively large amount of information in a relatively short time period.

The transfer belt 35 preferably transfers the output recording sheet P at a speed slightly faster than a speed at which the ejection rollers 13 eject the output recording sheet P, so that the ejected output recording sheet P may smoothly be removed from the region where the ejected output recording sheet P is stacked.

In the first embodiment with the sheet conveyer 30 installed in an operational position, a container C that is made of, for example, corrugated paper and that accommodates several output recording sheets P is preferably prepared at a position to which the output recording sheets P falls from the front edge of the transfer belt 35. The position to which the output recording sheets P falls is referred to as a sheet stack position. In this way, an event may be avoided, in which the ejected output recording sheets P are scattered.

In the above description, the sheet conveyer 30 is mounted on the first outlet tray 15 so as to transfer the recording sheet P in the same sheet transferring direction by the ejection rollers 13. Alternatively, the sheet conveyer 30 may be mounted in a different orientation so as to transfer the recording sheet P in an arbitrary direction, such as a direction orthogonal to the sheet transferring direction by the ejection rollers 13, for example. That is, a user may arbitrarily select a sheet stack position by changing the orientation of the sheet conveyer 30.

Figure 4:
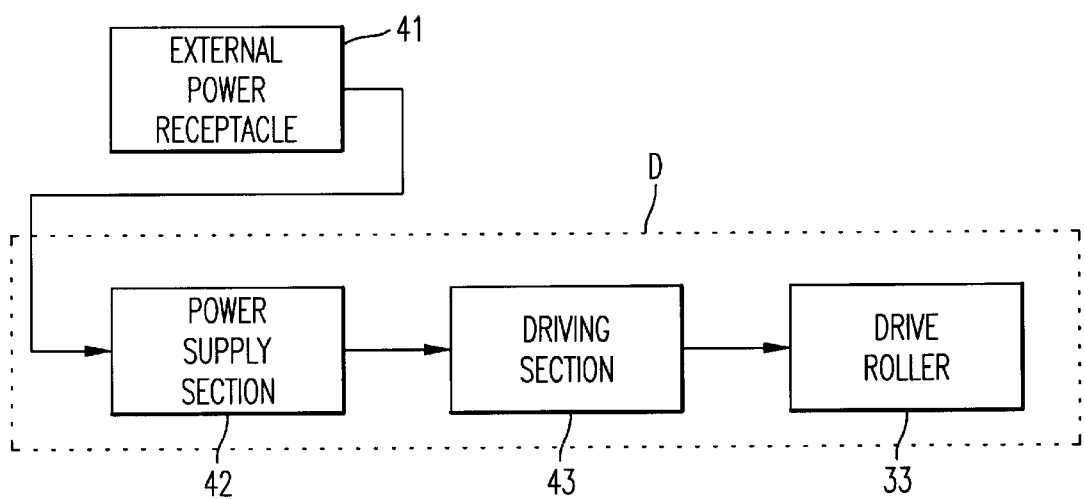
FIG. 4 is a block diagram of a driving portion that drives a rotary mechanism included in the sheet conveyer of FIG. 2.

A driving portion D of the sheet conveyer 30, illustrated in FIG. 4, includes the drive roller 33, a power supply section 42 connected to an external power supply source via an external power receptacle 41, and a driving section 43 with various driving components, including a motor and a clutch, to drive the drive roller 33 in synchronism with a facsimile operation. When power is supplied to the power supply section 42 via the external power receptacle 41, the power from the power supply section 42 activates the driving section 43, and then the drive roller 33 starts to rotate. Thus, the ejection operation of the output recording sheet P by the transfer belt 35 is initiated.

The power supply section 42 includes, preferably, a DC (Direct Current) adapter that enables the use of a commercial power and that has advantages in cost and easiness in obtaining. The driving section 43 includes a motor such as a DC brush-less motor, a stepping motor, or an electronic governor motor. Among these motors, the electronic governor motor may be preferable because this motor does not require a circuit board and has a relatively small variation in the number of revolutions.

Figure 5:
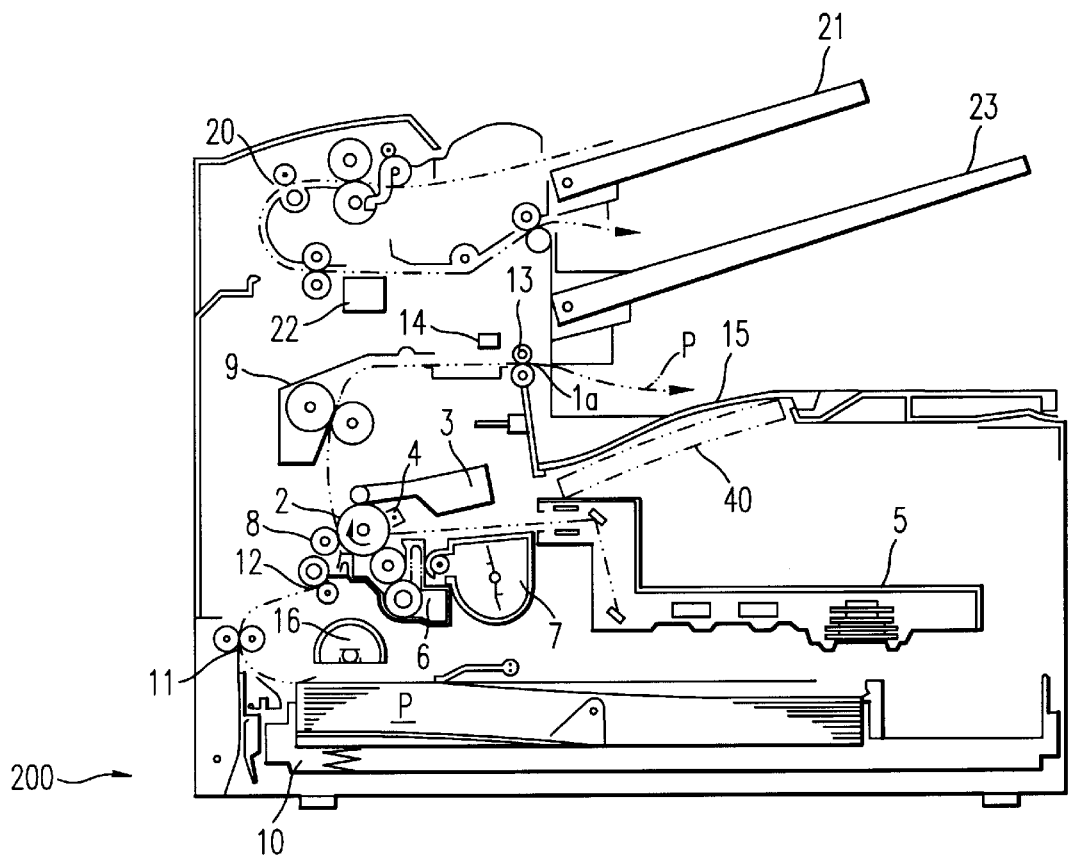
FIG. 5 illustrates a schematic internal side view of a facsimile apparatus as a second embodiment of the present invention.

Next, a second embodiment of the present invention is explained with reference to FIGS. 5–8. The second embodiment is a wing-less type facsimile apparatus 200 that is illustrated in FIG. 5. The wing-less type facsimile apparatus 200 includes elements that are similar to those of the above-described wing-less type facsimile apparatus 100. Therefore, in the following description with respect to the second embodiment, an element that corresponds to the element described with reference to FIGS. 1–4 is provided with the same reference numeral and, as a matter of course, the same description for this element is omitted.

Figure 6A:
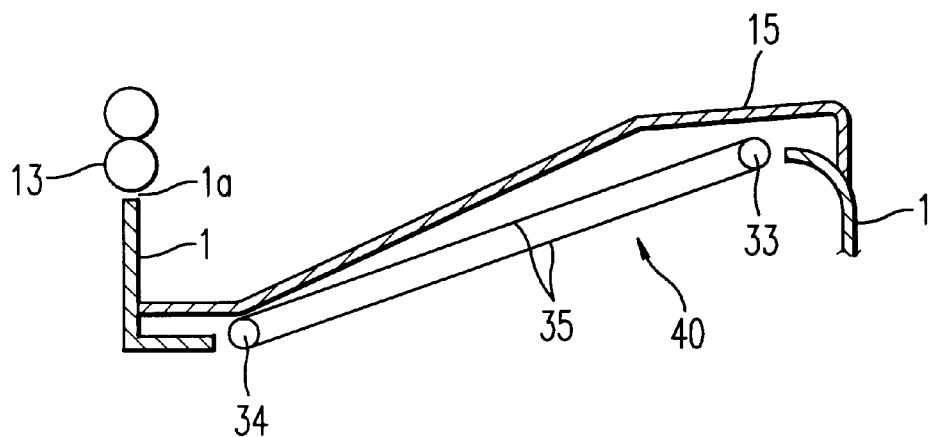
FIGS. 6(*a*) and 6(*b*) illustrate manners of a first outlet tray associated with the sheet conveyer of FIG. 2 when the first outlet tray is in and out of its functional position, respectively.
Figure 6B:
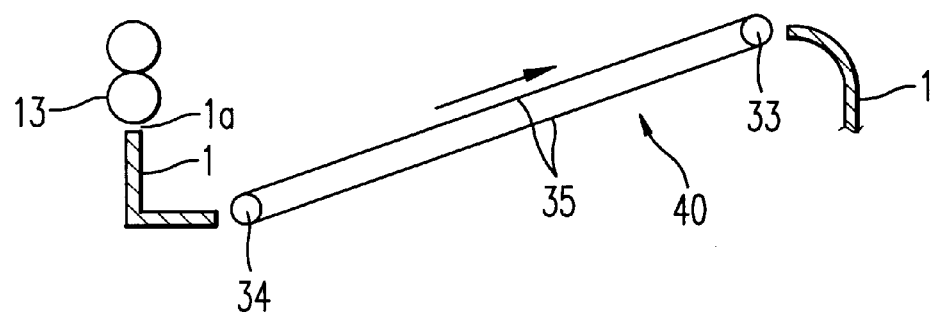

In the second embodiment, the first outlet tray 15 is detachably mounted and the rotary mechanism 40 is positioned under the first outlet tray 15 so as to be covered with the first outlet tray 15. That is, as illustrated in FIG. 6(a), the rotary mechanism 40 including the drive roller 33, idle roller 34, and transfer belt 35 is situated under the first outlet tray 15. When the first outlet tray 15 is in its normal operational position as illustrated in FIG. 6(a), the recording sheet P that is ejected by the ejection rollers 13 through the opening 1a falls onto the first outlet tray 15 where the recording sheet P is stacked. However, when the first outlet tray 15 is removed as illustrated in FIG. 6(b), the rotary mechanism 40 is placed into its operational position.

Figure 7:
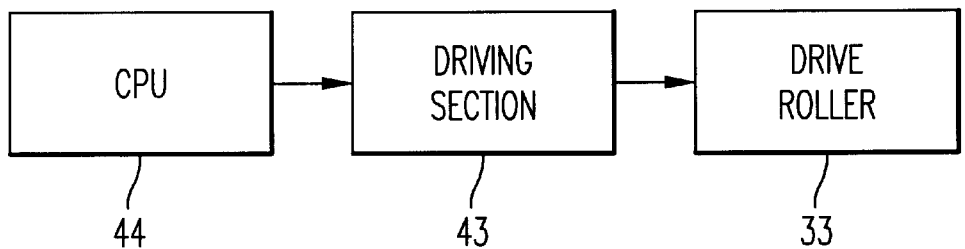
FIG. 7 is a block diagram of a control of the rotary mechanism included in the sheet conveyer of the second embodiment of FIG. 5.

As illustrated in FIG. 7, the driving section 43 is controlled by a control signal from a CPU (Central Processing Unit) 44 and switches between ON and OFF states. When turned on, the driving section 43 drives the drive roller 33 which then rotates the transfer belt 35, so that the recording sheet P that is ejected by the ejection rollers 13 through the opening 1a is transferred in the direction indicated by an arrow in FIG. 6(b).

Figure 8:
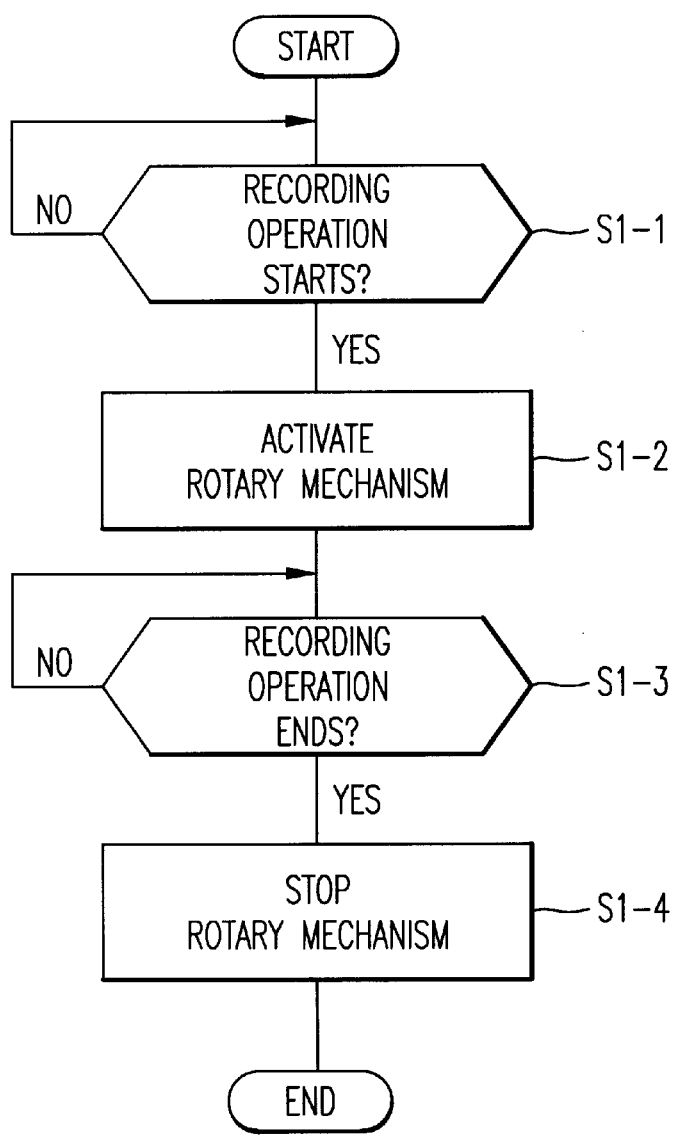
FIG. 8 is a flowchart explaining a control of the rotary mechanism included in the sheet conveyer of the second embodiment of FIG. 5.

An exemplary operation of FIG. 8 is explained below, for a case when the facsimile apparatus 200 needs to operate without an attendant for a relatively long time period or to receive a relatively large amount of information in a relatively short time period. During this operation, the first outlet tray 15 is removed and the rotary mechanism 40 is in operation. In Step S1-1, the CPU 44 determines whether or not the recording operation has started. Because Step S1-1 forms a NO loop, only when the recording operation starts and the determination result of Step S1-1 is YES, does the process proceed to Step S1-2. The CPU 44 then activates the rotary mechanism 40 to start the drive roller 33.

During this operation, a plurality of recording sheets P are successively ejected through the ejection rollers 13 and fall onto the transfer belt 35 which is rotating by the rotation of the drive roller 33. Accordingly, the rotating transfer belt 35 successively transfers the plurality of recording sheets P onto the sheet stack position. The CPU 44 determines if the recording operation is completed in Step S1-3. As Step S1-3 forms a NO loop, the process proceeds to Step S1-4 only when the recording operation is completed and the determination result of Step S1-3 is YES. In Step S1-4, the CPU 44 stops the rotary mechanism 40 which accordingly stops the drive roller 33.

In this way, Steps S1-1 through S1-4 will be repeated for each cycle of the recording operation. Thus, the facsimile apparatus 200 may perform the recording operation without causing a paper jam around the exit of the ejection rollers 13, when an attendant is not available for a relatively long time period or when receiving a relatively large amount of information in a relatively short time period.

In the above-described second embodiment, the rotary mechanism 40 may be simplified in structure and may transfer the recording sheet P without applying a constrained motion such as a direction change, resulting in no damage to the recording sheet P during the ejected-sheet transferring operation. This is because the rotating transfer belt 35 of the rotary mechanism 40 is so arranged to transfer the recording sheets P in the same direction as the ejection rollers 13 transfer them through the opening 1a.

Also, in the above-described second embodiment, the recording sheets P are not stacked on the transfer belt 35 because the drive roller 33 is so arranged to start immediately when the recording operation starts. Alternatively, the transfer belt 35 may be arranged to start at a predetermined time period after the recording operation is started, so that a plurality of the recording sheets P are stacked onto the transfer belt 35 during the predetermined time period and the transfer belt 35 then starts to transfer the plurality of the stacked recording sheets P at one time.

Next, a third embodiment of the present invention is explained with reference to FIGS. 9–11. The third embodiment is a wing-less type facsimile apparatus 300 illustrated in FIG. 9. The wing-less type facsimile apparatus 300 includes elements that are similar to those of the above-described wing-less type facsimile apparatus 100. Therefore, in the following description with respect to the third embodiment, an element that corresponds to the element described with reference to FIGS. 1–4 is provided with the same reference numeral and, as a matter of course, the same description for this element is omitted.

Figure 9:
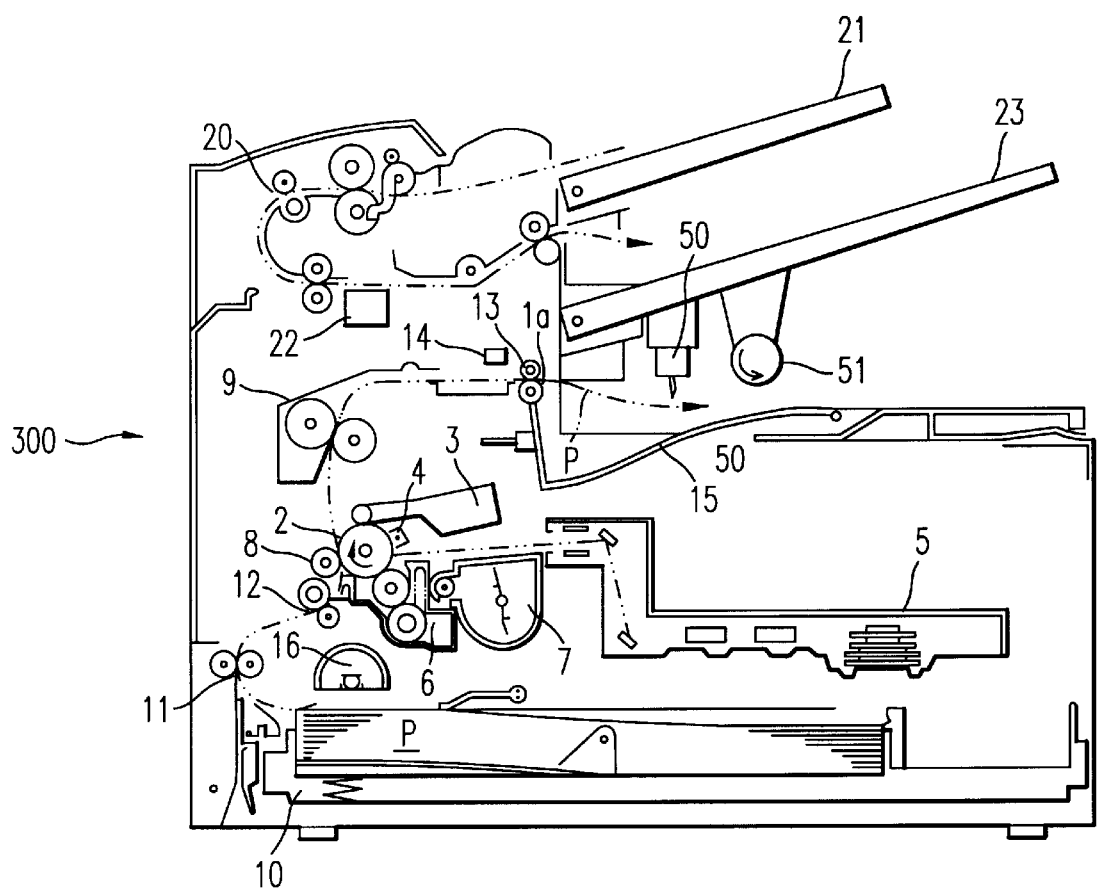
FIG. 9 illustrates a schematic internal side view of a facsimile apparatus as a third embodiment of the present invention.

As illustrated in FIG. 9, the facsimile apparatus 300 further includes a height detecting sensor 50 and an ejected-sheet transfer roller 51. For example, in the third embodiment, the height detecting sensor 50 and the ejected-sheet transfer roller 51 are mounted beneath the second outlet tray 23 and above the first outlet tray 15. In addition, the height detecting sensor 50 is positioned closer to the opening 1a than the ejected-sheet transfer roller 51, as illustrated in FIG. 9.

Figure 10:
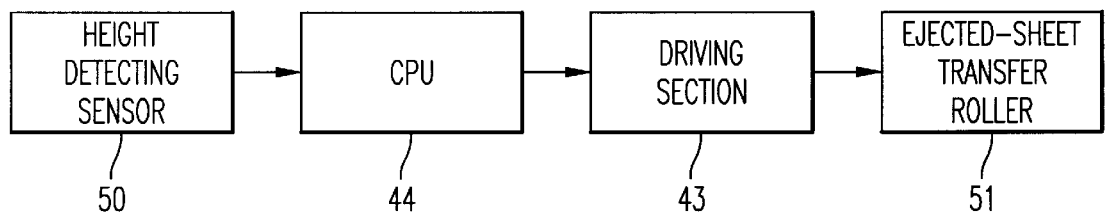
FIG. 10 is a block diagram of a control of the rotary mechanism included in the sheet conveyer of the third embodiment of FIG. 9.

As illustrated in the block diagram of FIG. 10, a mechanism for removing the ejected sheet stacked in the first outlet tray 15 includes the driving section 43, the CPU 44, the height detecting sensor 50, and the ejected-sheet transfer roller 51. The height detecting sensor 50 checks if the ejected recording sheets P stack in the first outlet tray 15 are at a predetermined height and if so sends an ON signal to the CPU 44. Then, the CPU 44 generates a drive signal to initiate the driving section 43. The driving section 43 drives the ejected-sheet transfer roller 51 to rotate in the direction indicated by an arrow in the drawing (i.e., counterclockwise) so that the ejected recording sheets P stacked in the first outlet tray 15 are removed from the first outlet tray 15.

During a time when an operator is not available, if the height detecting sensor 50 is not used, the ejected-sheet transfer roller 51 may be initiated immediately after the recording operation starts.

The ejected-sheet transfer roller 51 may be situated in such a way that the recording sheets P are transferred in a direction different from the direction in which the recording sheets P are transferred by the ejection rollers 13.

Figure 11:
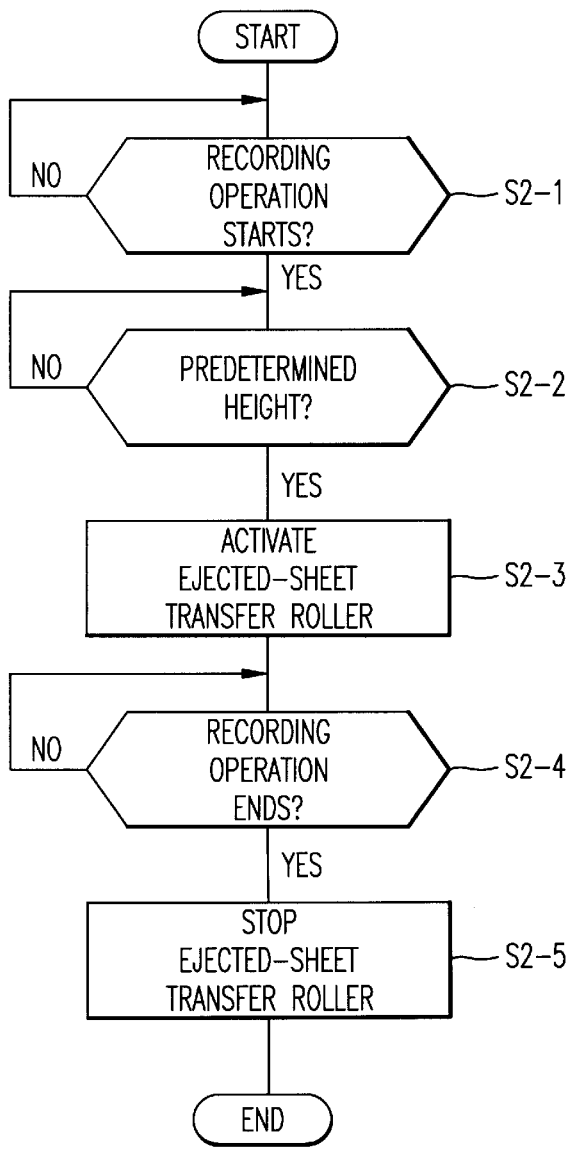
FIG. 11 is a flowchart explaining a control of the rotary mechanism included in the sheet conveyer of the third embodiment of FIG. 9.

FIG. 11 outlines an example of the recording operation by the third embodiment during a time when an operator is not available,. In Step S2-1 of FIG. 11, the CPU 44 checks if the recording operation is initiated. If the CPU determines a recording operation has not started (NO in Step S2-1), a NO loop is formed. Thus, only when the recording operation is initiated does the process proceed to Step S2-2 (YES in Step S2-1). In the recording operation, the recording sheets P are successively ejected by the ejection rollers 13 and are stacked in the first outlet tray 15. Accordingly, the height of the recording sheets P increases. In Step S2-2, the CPU 44 checks if the stack of the recording sheets P has reached a predetermined height. Because Step S2-2 forms a NO loop, only when the stack of the recording sheets P reaches the predetermined height does the process proceed to Step S2-3.

Upon detecting an event that the stack of the recording sheets P reaches the predetermined height in Step S2-2, the height detecting sensor 50 sends an ON signal to the CPU 44 and the CPU 44 initiates the drive section 43 to drive the ejected-sheet transfer roller 51 in Step S2-3. In Step S2-3, the recording sheets P which are successively ejected by the ejection rollers 13 are removed from a region around the opening 1a to the sheet stack position arranged outside the facsimile apparatus 300. Since the ejected-sheet transfer roller 51 operates until the recording operation ends, the CPU 44 checks if the recording operation is completed, in Step S2-4. Upon a completion of the recording operation, the CPU 44 stops the ejected-sheet transfer roller 51 in Step S2-5.

In the above-described way, the facsimile apparatus 300 removes the ejected recording sheets P from the first outlet tray 15 to the outside of the apparatus 300 whenever the stack of the recording sheets P reaches the predetermined height, so that an event of paper jamming can be avoided even during the time when an operator is not available.

Figure 12:
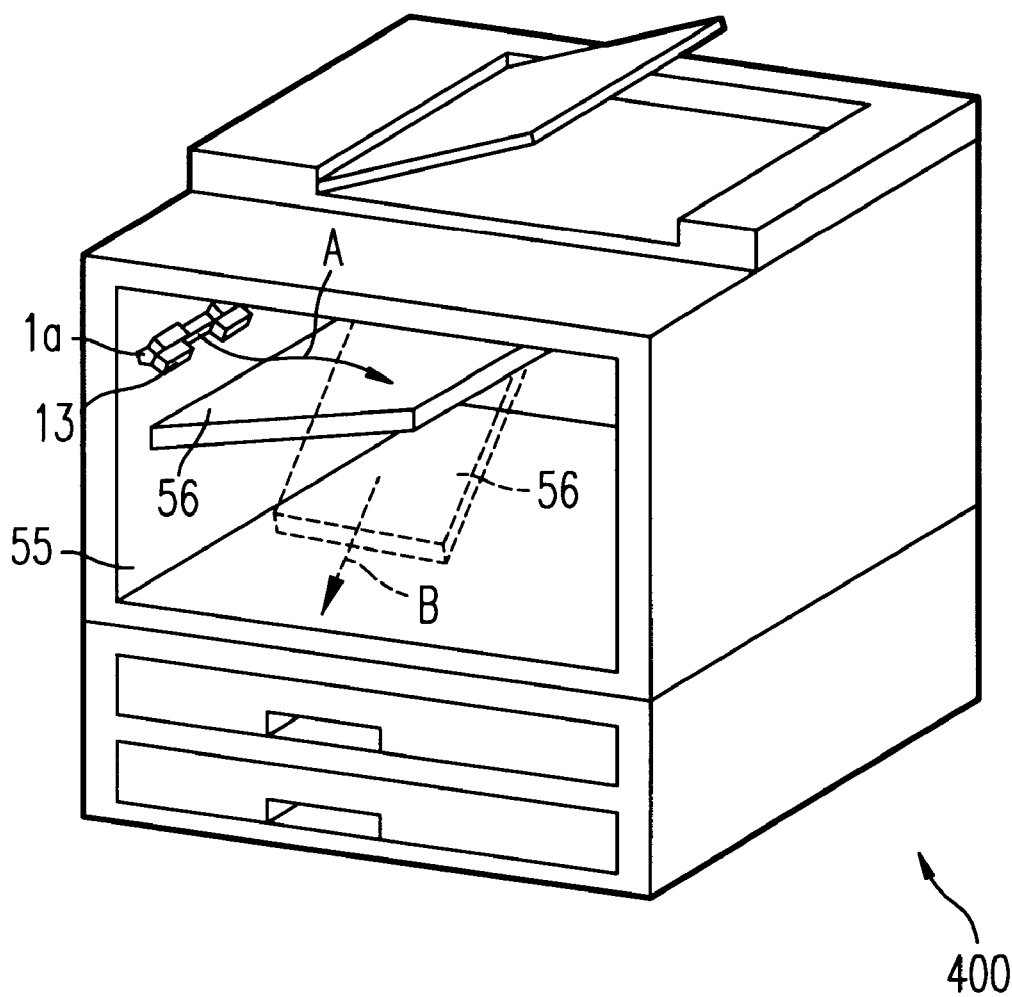
FIG. 12 illustrates a schematic internal side view of a facsimile apparatus as a fourth embodiment of the present invention.

Next, a fourth embodiment, a facsimile apparatus 400, is explained with reference to FIG. 12. The apparatus 400 of FIG. 12 includes elements similar to those of the facsimile apparatus 100 of FIG. 1 and also has a hollow structure for sheet ejection. The hollow structure is formed in a middle portion of the apparatus, as shown in FIG. 12.

More specifically, the facsimile apparatus 400 forms a hollow 55 around a region in which a recording sheet is ejected through the ejection rollers 13. The hollow 55 has an opening to the outside at one side thereof. In the hollow 55, a third outlet tray 56 for accommodating the recording sheets P is movably mounted. The third sheet tray 56 may be lifted up and down with an inner side thereof held as a pivot, as illustrated in FIG. 12.

With this structure as described above, the recording sheets P ejected through the opening 1a by the ejection rollers 13 in the direction of an arrow indicated by a letter A are stacked on the third outlet tray 56. When the stack of the recording sheets P reaches a weight which forces the third outlet tray 56 downwards, as illustrated by a dotted line in FIG. 12, the recording sheets P slide on the third outlet tray 56 in the direction of a dotted arrow indicated by a letter B and fall outside the facsimile apparatus 400.

In this way, the fourth embodiment is arranged to have the third outlet tray 56 remove the stack of recording sheets P to the outside of the apparatus. During this operation, the third outlet tray 56 removes the stack of the recording sheets P in a different direction than the ejection rollers 13 eject the recording sheets P through the opening 1a. Generally, facsimile apparatuses having the hollow structure require the recording sheets P to be removed in a direction different than the ejection rollers 13 eject the recording sheets P. As a result, a paper jam is caused because of the stack of the ejected recording sheets P are not removed when the apparatus is operated without an attendant for a relatively long time period or when the apparatus receives a relatively large amount of information in a relatively short time period. The fourth embodiment avoids this problem in a relatively simple and low cost manner.

Alternatively, the third outlet tray 56 may be moved upwards and downwards with a motor, for example, when a predetermined volume of the stacked recording sheets P is on the third outlet tray 56. Further, the above-mentioned predetermined volume of the ejected recording sheets P may be detected by detecting a height of the stack of the recording sheets P by an additionally mounted sensor, for example.

Next, a fifth embodiment, a facsimile apparatus 500, is explained with reference to FIGS. 13–16. The facsimile apparatus 500 of FIG. 13 includes elements similar to those of the apparatus 100 of FIG. 1. Therefore, in describing the fifth embodiment, an element which corresponds to the element described with reference to FIG. 1 is provided with the same reference numeral and the same description for this element is omitted.

Figure 13:
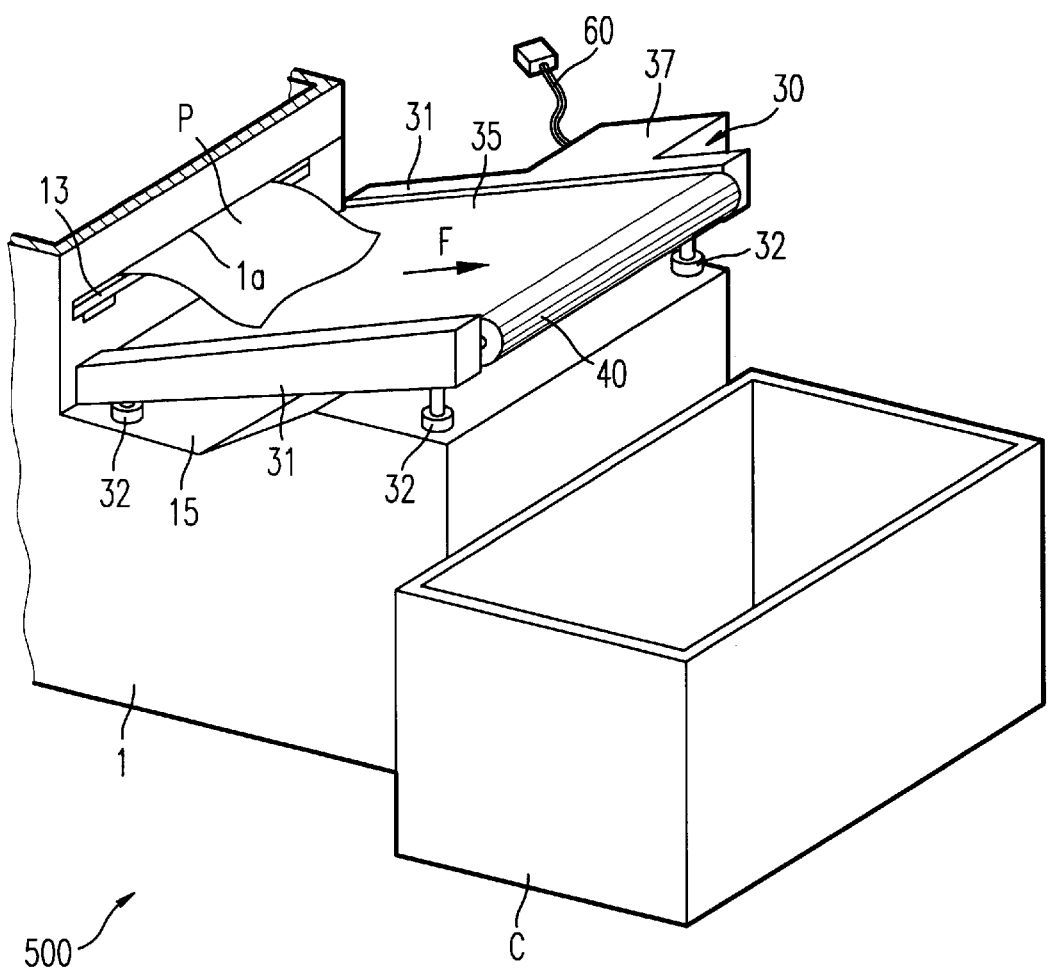
FIG. 13 illustrates a schematic internal side view of a facsimile apparatus as a fifth embodiment of the present invention.

As illustrated in FIG. 13, the facsimile apparatus 500 further includes a signal cable 60 extended from the utility portion 37 for connecting the electrical components of the sheet conveyer 30 to a facsimile controller 63 (FIG. 15) included in the facsimile apparatus 500.

Figure 14:
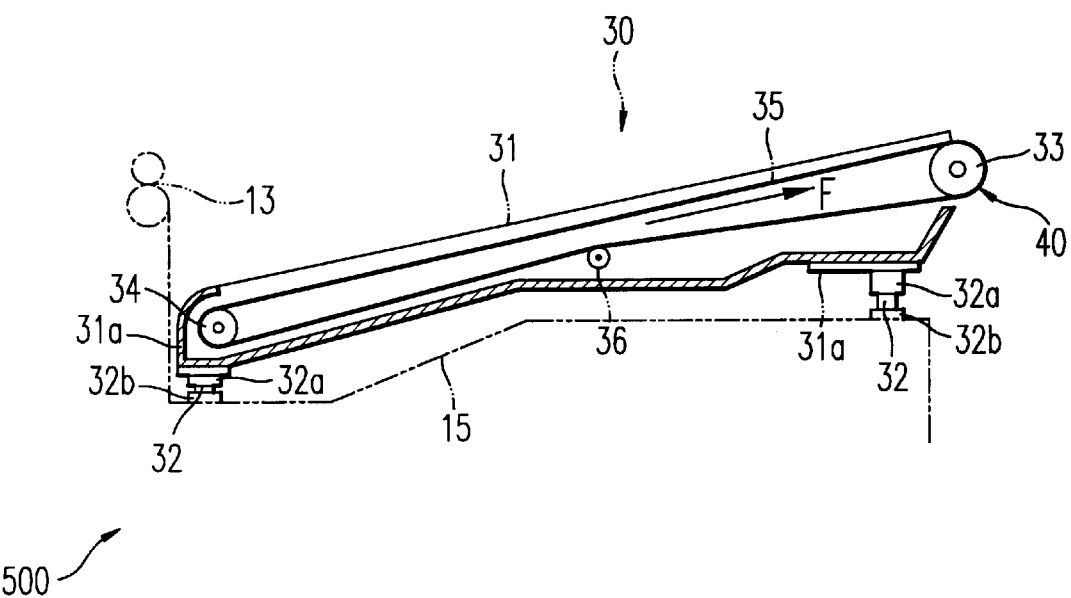
FIG. 14 illustrates a schematic internal side view of the sheet conveyer included in the fifth embodiment of FIG. 13.

In the fifth embodiment of FIG. 14, each of the supporting feet 32 mounted under each of the frame members 31 at each corner of the sheet conveyer 30 includes a base member 32a having an internal thread and an adjust member 32b having an external thread that is fit for the internal thread of the base member 32a. Each of the adjust members 32b has a bottom surface in contact with the first outlet tray 15 and the bottom surface is made of pliant materials so as to prevent damage, such as scratches on the surface of the third outlet tray 15. Further, each of the adjust members 32b may be rotated clockwise and counter-clockwise so as to move in and out of the threaded hole of the corresponding base member 32a, thereby adjusting the height of the corresponding supporting foot 32. Each of the base members 32a is engaged in a guide member 31a provided at the bottom surface of each of the frame members 31. The guide members 31a can adjust the positions of the supporting feet 32 so that the rotary mechanism 40 may be situated in a slightly different position along the longitudinal direction of the first outlet tray 15.

Figure 15:
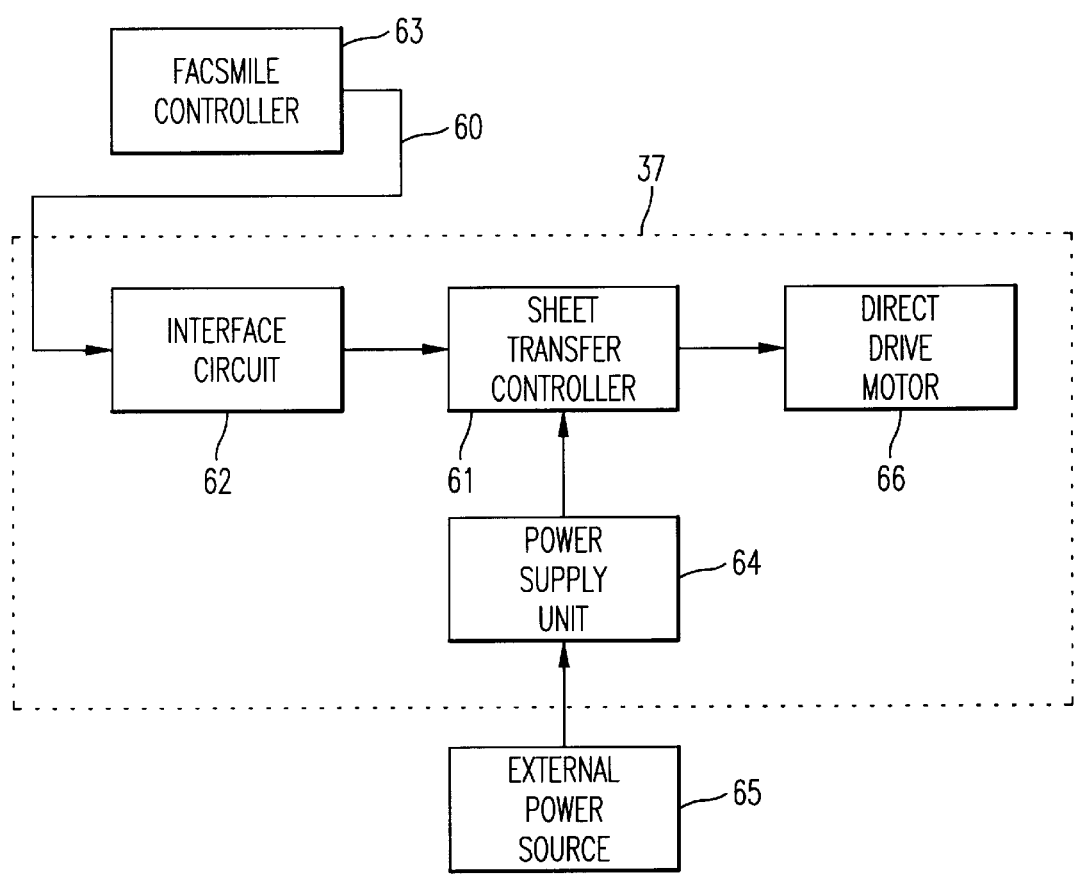
FIG. 15 is a block diagram of a control of the rotary mechanism included in the sheet conveyer of the fifth embodiment of FIG. 13.

As illustrated in the block diagram of FIG. 15, the fifth embodiment includes the utility portion 37 that is connected to the facsimile controller 63 via the electrical cable 60. The utility portion includes a sheet transfer controller 61 for controlling an operation of transferring the ejected recording sheets P, and an interface circuit 62 for interfacing signals between the utility portion 37 and the facsimile controller 63. Further, the facsimile controller 63 includes a power supply unit 64 that supplies a DC (direct current) at a predetermined voltage using an alternating current supplied from an external power source 65 and a direct drive motor 66 that forwards a force to the drive roller 33 directly without a torque transmitting mechanism such as gears, for example.

As mentioned above, the height of the supporting feet 32 may be adjusted by the adjust members 32b. This adjustment may be useful when the sheet conveyer 30 is mounted on the first outlet tray 15 with a relatively large slope. That is, facsimile apparatuses, in general, have a sloped sheet tray such as the first outlet tray 15 of FIG. 14 and the sheet conveyer 30 on such a sloped sheet tray 15 will also have a slope which may be too large to convey the ejected recording sheets P in some cases.

In the fifth embodiment, the direct drive motor 66 is controlled by the facsimile controller 63 via the sheet transfer controller 61. More specifically, the facsimile controller 63 determines start and stop times of the motor according to a sheet transfer control program. Based on the determined start and stop times, the facsimile controller 63 sends start and stop signals to the sheet transfer controller 61 via the interface circuit 62, to start and to stop the direct drive motor 66.

Further, in the fifth embodiment, the control of the sheet conveyer 30 is performed cooperatively by the facsimile controller 63 and the sheet transfer controller 61. However, as an alternative, the sheet transfer controller 61 may include several more functions for detecting statuses of the facsimile apparatus, determining start and stop times of the direct drive motor 66 based on the detected statuses, and so forth, for example. The thus-arranged sheet transfer controller 61 may be applied more flexibly to many different types of facsimile apparatus.

Figure 16:
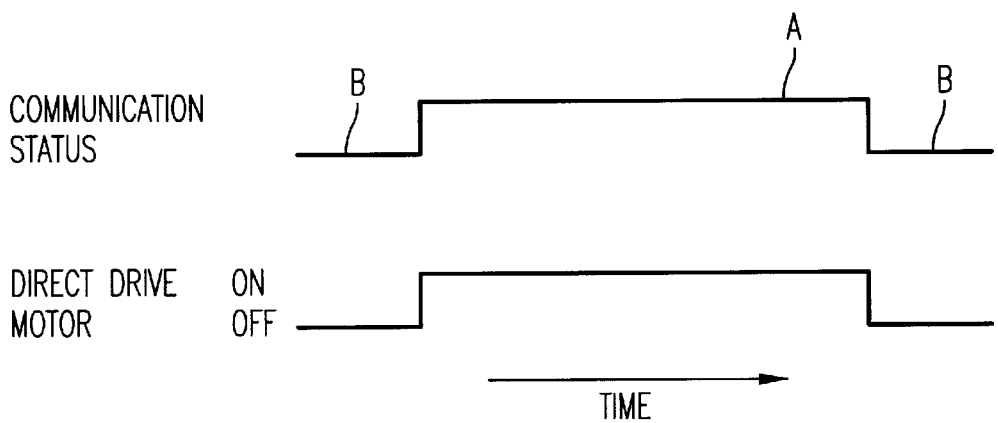
FIGS. 16–18 are timing diagrams for explaining ways of controlling a direct drive motor included in the fifth embodiment of FIG. 13.

An exemplary control procedure of the sheet conveyer 30 will now be explained with reference to FIG. 16. In the exemplary procedure, when the facsimile apparatus 500 receives a call signal from a telephone switch board, the facsimile controller 63 controls to connect a facsimile communication unit (not shown) of the apparatus 500 to the telephone line, thereby establishing a communication-on state which is indicated by a letter A in FIG. 16. The facsimile controller 63 also sends a start signal to the sheet transfer controller 61 in synchronism with the timing of establishing the communication-on state. Upon receiving the start signal, the sheet transfer controller 61 applies a current to the direct drive motor 66 so as to rotate the transfer belt 35. Then, the recording sheets P on the transfer belt 35 are moved from a region near the opening 1a to another region.

The start signal to be sent to the sheet transfer controller 61 may be generated at a rise time of the communication-on state or at a predetermined time after the rise time of the communication-on state. In this case, the predetermined time is set to a value smaller than a total time from the rise time of the communication-on state to a completion of the recording sheets P being ejected by the ejection rollers 13.

Upon determining a completion of the communication from the source facsimile apparatus, the facsimile controller 63 disconnects the telephone line to end the communication. A state of communication which is ended is indicated by a letter B in FIG. 16. The facsimile controller 63 sends a stop signal to the sheet transfer controller 61 in synchronism with the end time of the communication. Upon receiving the stop signal, the sheet transfer controller 61 finishes applying the current to stop the direct drive motor 66.

The stop signal to be sent to the sheet transfer controller 61 may be generated at the communication end time or in a predetermined time after the communication is ended. In this case, the predetermined time is set to a value smaller than a total time from the communication end time to a time when the recording sheets P being ejected by the ejection rollers 13 is completed. When the stop signal is set at the communication end time, the recording sheets P may remain on the transfer belt 35 after a completion of the facsimile communication. However, these remaining recording sheets P may not cause a problem because they can be transferred by the transfer belt 35 in a next rotation of the transfer belt 35.

In the above-described way, the facsimile apparatus 500 removes the stack of the ejected recording sheets P from the region near the opening 1a to the outside of the apparatus 500 in synchronism with the communication-on and -off state times so as to avoid paper jams even during the time when an operator is not available.

Figure 17:
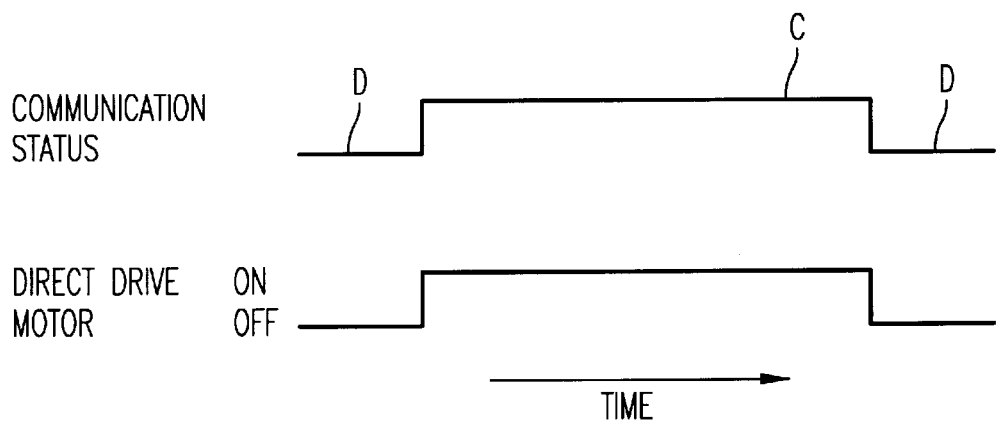

Next, another exemplary controller procedure of the sheet conveyer 30 of the facsimile apparatus 500 is explained with reference to FIG. 17. In this procedure, when the facsimile apparatus 500 receives a call signal from the telephone switch board, the facsimile controller 63 controls to connect the facsimile communication unit to the telephone line. At the same time, the facsimile controller 63 also performs initial settings for a facsimile communication in accordance with control signals that are sent from the source facsimile apparatus according to predetermined protocols. After completing the initial settings, the facsimile controller 63 stores an image signal sent from the source facsimile apparatus into an image memory (not shown). The image memory is preferably a RAM (Random Access Memory), for example. Then, the facsimile controller 63 sends a start signal to the sheet transfer controller 61 in synchronism with a start time of receiving the image signal from the source facsimile. A time period of receiving the image signal is indicated by a letter C in FIG. 17. Upon receiving the start signal, the sheet transfer controller 61 applies a current to the direct drive motor 66 so as to rotate the transfer belt 35. Then, the recording sheets P on the transfer belt 35 are moved from a region near the opening 1a to another region.

The start signal to be sent to the sheet transfer controller 61 may be generated at start time of receiving the image signal or at a predetermined time after the start of receiving the image signal. In this case, the predetermined time is set to a value smaller than a total time from the start time of receiving the image signal to a completion of the recording sheet P being ejected by the ejection rollers 13.

Upon a completion of storing the image signal from the source facsimile apparatus into the image memory, the facsimile controller 63 sends an acknowledge signal to the source facsimile apparatus and disconnects the telephone line to end the communication with the source facsimile apparatus. A state of communication which is ended is indicated by a letter D in FIG. 17. The facsimile controller 63 sends a stop signal to the sheet transfer controller 61 in synchronism with the timing of ending the communication. Upon receiving the stop signal, the sheet transfer controller 61 finishes applying the current to stop the direct drive motor 66.

The stop signal to be sent to the sheet transfer controller 61 may be generated at the end time of the communication or in a predetermined time after the communication is ended. In this case, the predetermined time is set to a value smaller than a total time from the end time of the communication to a completion of the recording sheets P being ejected by the ejection rollers 13. When the stop signal is set at the end time of the communication, the recording sheets P may remain on the transfer belt 35 after a completion of the facsimile communication. However, these remaining recording sheets P may not cause a problem because they can be transferred by the transfer belt 35 in the next rotation of the transfer belt 35.

In the above-described alternative way, the facsimile apparatus 500 removes the stack of the ejected recording sheets P from the region near the opening 1a to the outside of the apparatus 500 in synchronism with the timings of receiving the image signal from the source facsimile apparatus so as to avoid paper jams even during the time when an operator is not available.

Figure 18:
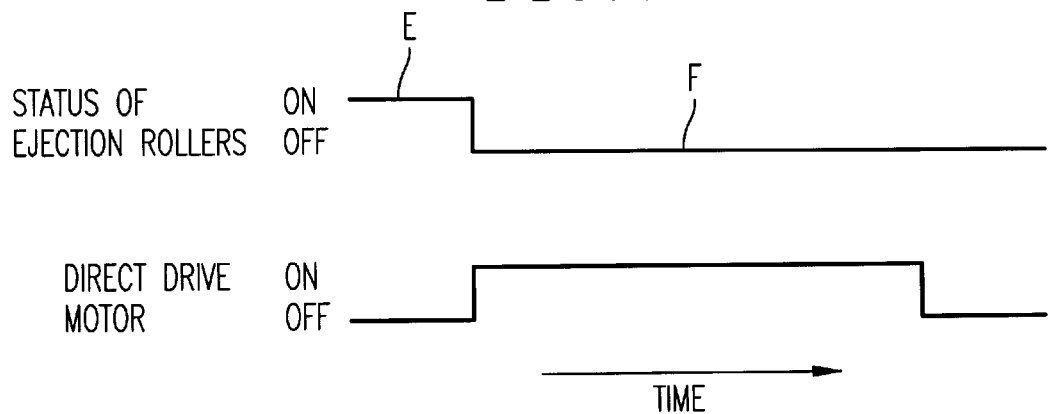

Next, still another exemplary controller procedure of the sheet conveyer 30 of the facsimile apparatus 500 is explained with reference to FIG. 18. In this procedure, when the facsimile apparatus 500 receives a call signal from the telephone switch board, the facsimile controller 63 controls to connect the facsimile communication unit to the telephone line. At the same time, the facsimile controller 63 also performs initial settings for a facsimile communication in accordance with control signals that are sent from the source facsimile apparatus according to predetermined protocols. After completing the initial settings, the facsimile controller 63 stores an image signal sent from the source facsimile apparatus into an image memory (not shown). At this time, the facsimile controller 63 loads an amount of image data for one page from the image memory. After loading the data, the facsimile controller 63 arranges to start the recording operation in which an image is recorded on the recording sheet P in accordance with the image data stored in the image memory. The facsimile controller 63 successively performs this page-by-page recording operation until the entire amount of image data received from the source facsimile apparatus is recorded. During this recording operation, the facsimile controller 63 starts to rotate the photoconductive drum 2 and the ejection rollers 13. The ejection rollers 13 will be stopped only at a predetermined time period after the last page of the recording sheet P is detected by the sheet-eject detect sensor 14, so that it can be made sure the last page of the recording sheet P is ejected by the ejection rollers 13.

In this procedure, the facsimile controller 63 sends a start signal to the sheet transfer controller 61 at a time when the ejection rollers 13 are stopped. Time periods for activating and stopping the ejection rollers 13 are indicated by letters E and F, respectively, in FIG. 18. Upon receiving the start signal, the sheet transfer controller 61 applies a current to the direct drive motor 66 so as to rotate the transfer belt 35, on which all of the recording sheets P are stacked in a page order. Subsequently, the recording sheets P on the transfer belt 35 are moved from a region near the opening 1*a* to another region.

The facsimile controller 63 counts a predetermined time period from the timing of sending the start signal with a built-in timer (not shown). The predetermined time period is a time required to complete transferring the stack of the recording sheets P to the predetermined appropriate sheet stack position, i.e., the inside of the container C. The facsimile controller 63 sends a stop signal when the predetermined time period passes so as to stop the rotation of the ejection rollers 13. Upon receiving the stop signal, the sheet transfer controller 61 finishes applying the current to stop the direct drive motor 66.

In the above-described alternative way, the facsimile apparatus 500 removes the ejected recording sheets P from the region near the opening 1*a* to the outside of the apparatus 500 in synchronism with the on/off timings of the ejection rollers 13, so as to avoid paper jams even during the time when an operator is not available.

Next, a facsimile apparatus 600 as a sixth embodiment of the present invention is explained with reference to FIGS. 19 and 20. The sixth embodiment is a wing-less type facsimile apparatus. The wing-less type facsimile apparatus 600 includes elements that are similar to those of the above-described wing-less type facsimile apparatus 500 of FIG. 13. Therefore, in the following description with respect to the sixth embodiment, an element that corresponds to the element described with reference to FIGS. 13–15 is provided with the same reference numeral and, as a matter of course, the same description for this element is omitted.

Figure 19:
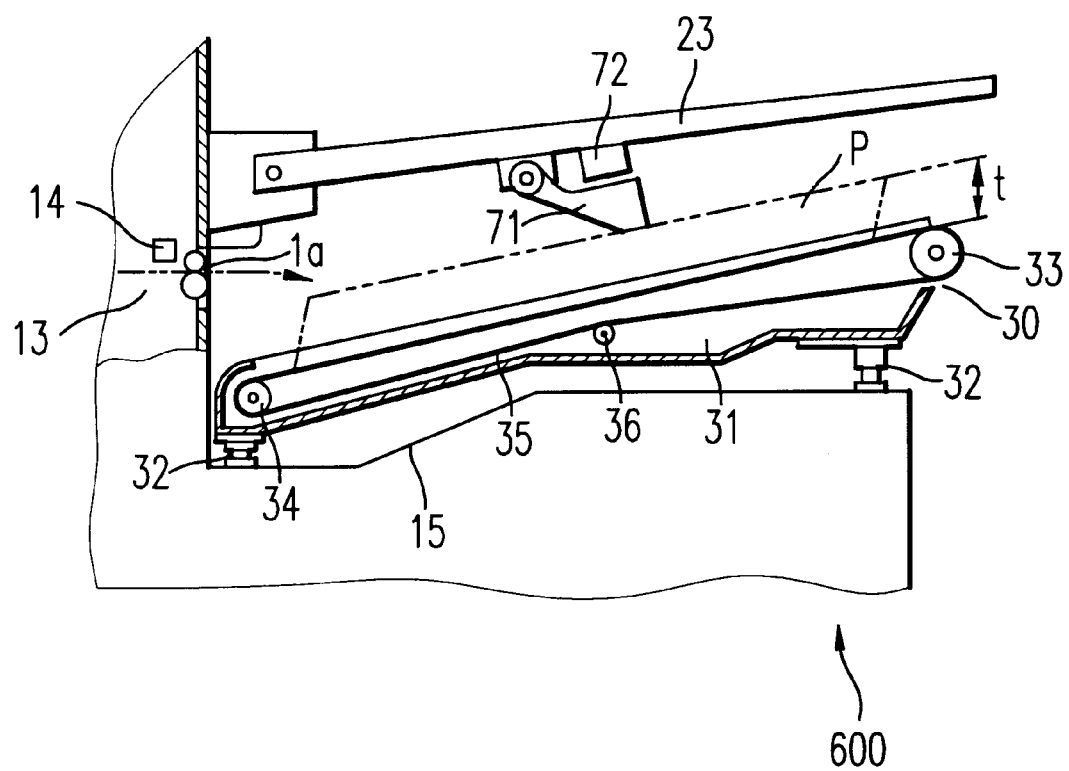
FIG. 19 illustrates a part of a sixth embodiment for explaining another way of controlling a direct drive motor.
Figure 20:
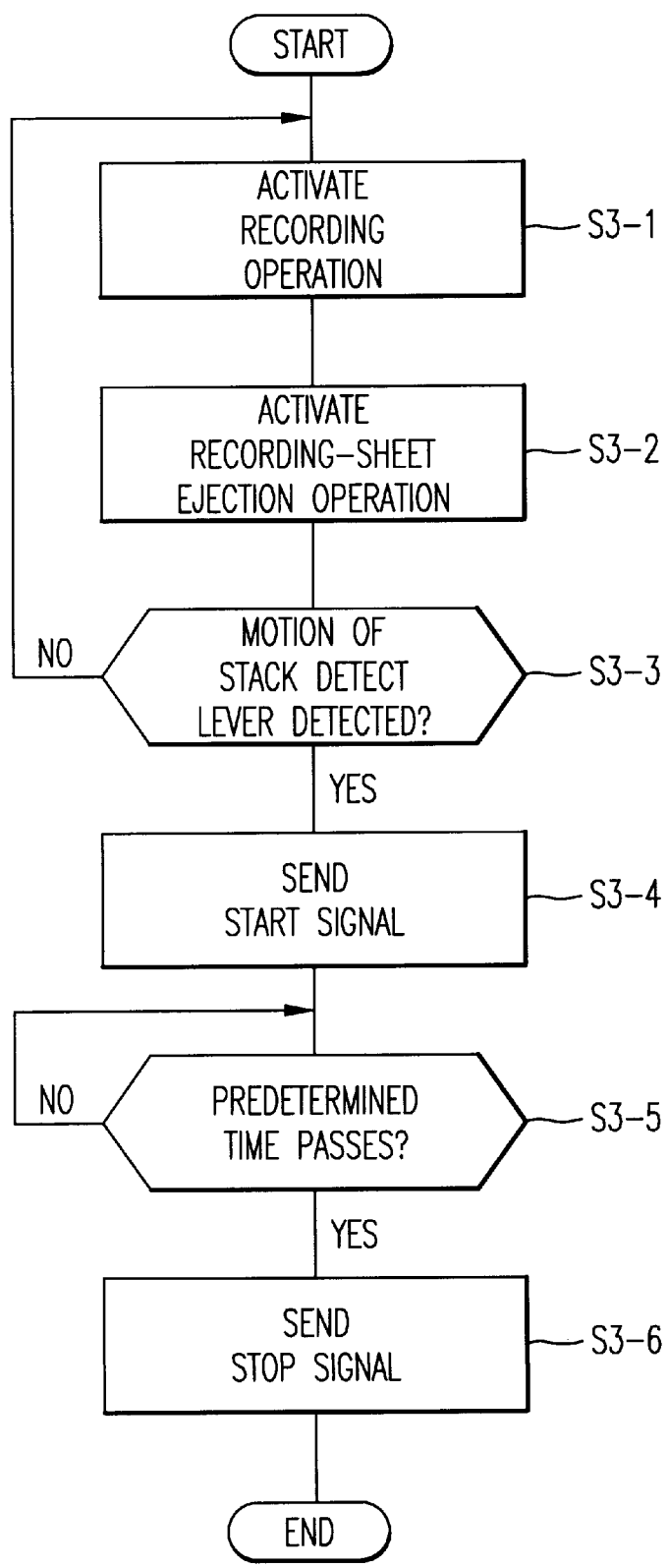
FIG. 20 is a flowchart for explaining another way to control the rotary mechanism included in the sheet conveyer of the sixth embodiment of FIG. 19.

As illustrated in FIG. 19 in which the facsimile apparatus 600 in part is illustrated, the apparatus 600 further includes a stack detect lever 71 which may be pressed upwards by the stacked recording sheets P and a stack detect sensor 72 for detecting when the stack detect lever 71 is pressed upwards. The stack detect lever 71 and the stack detect sensor 72 may be mounted on the bottom surface of the second outlet tray 23 and above the first outlet tray 15. The stack detect lever 71 is movably held underneath the second outlet tray 23 and is normally positioned at its most lowered position. When the stack of the recording sheets P reaches a height "t", as illustrated by a broken line shown in FIG. 19, the stack detect lever 71 is pressed upwards by a latest output recording sheet P ejected by the ejection rollers 13. The stack detect sensor 72 includes a micro switch (not shown), a photo interrupter (not shown), and other electrical components and detects the movement of the stack detect lever 71 and then sends a detect signal to the facsimile controller 63.

In the thus-arranged facsimile apparatus 600, when the apparatus 600 receives a call signal from the telephone switch board, the facsimile controller 63 controls to connect the facsimile communication unit to the telephone line. At the same time, the facsimile controller 63 also performs initial settings for a facsimile communication in accordance with control signals that are sent from the source facsimile apparatus according to predetermined protocols. After completing the initial settings, the facsimile controller 63 stores an image signal sent from the source facsimile apparatus into an image memory (not shown). At this time, the facsimile controller 63 loads an amount of image data for one page from the image memory. After loading the data, the facsimile controller 63 arranges to start the recording operation in which an image is recorded on the recording sheet P in accordance with the image data stored in the image memory. The facsimile controller 63 successively performs this page-by-page recording operation until the entire amount of image data received from the source facsimile apparatus is recorded. During this recording operation, the facsimile controller 63 starts to rotate the photoconductive drum 2 and the ejection rollers 13. The ejection rollers 13 will be stopped only at a predetermined time period after the last page of the recording sheet P is detected by the sheet-eject detect sensor 14, so that it can be made sure the last page of the recording sheet P is ejected by the ejection rollers 13.

Exemplary steps of removing the ejected recording sheets P will now be explained with reference to the flowchart of FIG. 20. After a completion of receiving the image signal from the source facsimile apparatus, the facsimile controller 63 starts the recording operation in which all of the image data stored in the memory is recorded in successive pages in Step S3-1. Then, in Step S3-2, the recording sheet ejection operation ejects all the pages in a page order. In Step S3-3, the facsimile controller 63 determines if the stack detect sensor 72 detects a motion of the stack detect lever 71. When a certain number of recording sheets P are stacked on the transfer belt 35 and, as a result, the latest recording sheet P presses the stack detect lever 71, the stack detect sensor 72 senses the motion of the stack detect lever 71. When the determination result of Step S3-3 is NO, the cycle of Steps S3-1 through S3-3 will repeat. When the determination result of Step S3-3 is YES, the facsimile controller 63 sends a start signal to the sheet transfer controller 61 in Step S3-4.

Upon receiving the start signal, the sheet transfer controller 61 applies a current to the direct drive motor 66 so as to rotate the transfer belt 35. Then, the stack of the recording sheets P that reached the predetermined height t is moved from a region near the opening 1*a* to another region.

The facsimile controller 63 counts a predetermined time period from the timing of sending the start signal with a built-in timer (not shown). The predetermined time period is a total time required to complete transferring the stack of the recording sheets P to the predetermined appropriate sheet stack position, i.e., the inside of the container C.

In Step S3-5, the facsimile controller 63 determines whether or not the predetermined time period has passed. If the determination result of Step S3-5 is NO, the determination repeats. If the determination result is YES, the facsimile controller 63 sends a stop signal to the sheet transfer controller 61 in Step S3-6. Upon receiving the stop signal, the sheet transfer controller 61 finishes applying the current to stop the direct drive motor 66.

In the above-described alternative way, the facsimile apparatus 500 removes the stack of the ejected recording sheets P from the region near the opening 1a to the outside of the apparatus 500 in synchronism with the time at which the stack of the ejected recording sheets P reaches the predetermined height t so as to avoid an event of paper jamming at the region near the opening 1a even during the time when an operator is not available.

Alternatively, the start signal may be selected according to a predetermined counted number of recording sheets P. The thus-arranged facsimile apparatus 500 can remove the stack of the ejected recording sheets P from the region near the opening 1a to the outside of the apparatus 500 in synchronism with the timing at which the stack of the ejected recording sheets P reaches the predetermined number so as to avoid an event of paper jamming at the region near the opening 1a even during the time when an operator is not available.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

This application is based on Japanese patent application Nos. JPAP09-100697, JPAP09-180654, JPAP09-198683, and JPAP10-022230 filed in the Japanese Patent Office on Apr. 18, 1997, Jun. 20, 1997, Jul. 24, 1997, and Feb. 3, 1998, respectively. The entire contents of the applications are hereby incorporated by reference.

What is claimed as new and is desired to be secured by Letters Patent of the United States is:

1. A data transmission and receiving apparatus, comprising:
    an image recording mechanism that records an image on a recording sheet;
    an ejection mechanism that ejects a recording sheet recorded by said image recording mechanism;
    a sheet tray that accommodates said recording sheet ejected by said ejection mechanism;
    a sheet conveyer mounted underneath said ejection mechanism and over said sheet tray, said sheet conveyer comprising:
        a pair of frames;
        a plurality of foot members mounted on a bottom surface of said pair of frames; and
        a sheet conveying mechanism held for rotation between said pair of frames, said sheet conveying mechanism, comprising:
            a belt that conveys said recording sheet ejected by said ejection mechanism;
            a drive roller that drives said belt; and
            an idle roller,
    said sheet conveyer further comprising:
        a drive member that drives said drive roller of said sheet conveying mechanism; and
        a power supply source that applies a power to said drive member,
    wherein the sheet conveyor is selectively detachable from the sheet tray so as to accommodate a second set of recording sheets different from a first set of recording sheets accommodated by the sheet tray.

2. The data transmission and receiving apparatus according to claim 1, wherein said drive member drives said drive roller to transfer the recording sheet at a speed faster than a speed at which the recording sheet is ejected by said ejection mechanism.

3. A data transmission and receiving apparatus, comprising:
    an image recording mechanism that records an image on a recording sheet;
    an ejection mechanism that ejects a recording sheet recorded by said image recording mechanism;
    a sheet tray that accommodates said ejected recording sheet; and
    a sheet conveyer that is detachably situated underneath said ejection mechanism and that includes a sheet conveying mechanism for conveying the recording sheet to an outside of said apparatus,
    wherein the sheet tray is selectively detachable from the sheet conveyor so as to accommodate a second set of recording sheets different from a first set of recording sheets accommodated by the sheet tray.

4. The data transmission and receiving apparatus according to claim 3, wherein said sheet tray is detachably mounted over said sheet conveying mechanism.

5. The data transmission and receiving apparatus according to claim 3, wherein said sheet conveying mechanism is detachable with respect to said sheet tray.

6. The data transmission and receiving apparatus according to claim 3, wherein said sheet conveying mechanism conveys the recording sheet in a same direction as said ejection mechanism ejects the recording sheet.

7. The data transmission and receiving apparatus according to claim 3, wherein said sheet conveying mechanism conveys the recording sheet in a different direction from a direction that said ejection mechanism ejects the recording sheet.

8. The data transmission and receiving apparatus according to claim 3, wherein said sheet conveying mechanism comprises:
    a belt that conveys said recording sheet ejected by said ejection mechanism;
    a drive roller that drives said belt; and
    an idle roller.

9. A data transmission and receiving apparatus, comprising:
    a data transmission and receiving controller that controls a data transmission and receiving operation;
    an image recording mechanism that records an image on a recording sheet;
    an ejecting mechanism that ejects a recording sheet recorded by said image recording mechanism;
    a sheet tray that accommodates said recording sheet ejected by said ejection mechanism; and
    a sheet conveyer detachably mounted underneath said ejection mechanism and over said sheet tray, said sheet conveyer, comprising:

a sheet conveying mechanism that conveys the recording sheet ejected by said ejection mechanism to a predetermined stack position;

a drive member that drives said sheet conveying mechanism;

an interface circuit that interfaces signals with said data transmission and receiving controller; and a controller that controls said drive member in accordance with said signals sent from said data transmission and receiving controller to start and to stop said sheet conveying mechanism, wherein the sheet conveyor is selectively detachable from the sheet tray so as to accommodate a second set of recording sheets different from a first set of recording sheets accommodated by the sheet tray.

10. The data transmission and receiving apparatus according to claim 9, wherein said controller starts said sheet conveying mechanism in synchronism with an event that said data transmission and receiving controller receives a call from a source data terminal and stops said sheet conveying mechanism in synchronism with an event that said data transmission and receiving controller finishes a data receiving operation.

11. The data transmission and receiving apparatus according to claim 9, wherein said controller starts said sheet conveying mechanism in synchronism with an event that said data transmission and receiving controller starts to receive an image signal from a source data terminal and stops said sheet conveying mechanism in synchronism with an event that said data transmission and receiving controller finishes a data receiving operation.

12. The data transmission and receiving apparatus according to claim 9, wherein said controller starts said sheet conveying mechanism in synchronism with an event that a last recording sheet is ejected out of recording sheets on which entire data sent from a source data terminal in one communication session are recorded and said controller stops said sheet conveying mechanism in synchronism with an event that said sheet conveying mechanism conveys recording sheets stacked on said sheet conveying mechanism to a predetermined stack position.

13. The data transmission and receiving apparatus according to claim 12, wherein said controller starts said sheet conveying mechanism in synchronism with a timing to stop a sheet ejection operation of said ejection mechanism.

14. The data transmission and receiving apparatus according to claim 9, wherein said controller starts said sheet conveying mechanism in synchronism with one of the events, whichever occurs earlier, that said ejection mechanism completes and stops a sheet ejection operation and that a last recording sheet is ejected out of at least one of a predetermined number of said recording sheets and a predetermined height of a stack of said recording sheets and said controller stops said sheet conveying mechanism in synchronism with an event that said sheet conveying mechanism conveys said recording sheets stacked on said sheet conveying mechanism to a predetermined stack position.

15. A sheet conveyer which is detachably provided to a data transmission and receiving apparatus having an ejection mechanism for ejecting a recording sheet recorded by said apparatus and a sheet tray for accommodating an ejected recording sheet, said sheet conveyer being mounted underneath said ejection mechanism and over said sheet tray of said apparatus, said sheet conveyer comprising:

a pair of frames;

a plurality of foot members mounted on the bottom surface of said pair of frames; and a sheet conveying mechanism held for rotation between said pair of frames, said sheet conveying mechanism, comprising:

a belt that conveys said recording sheet ejected by said ejection mechanism;

a drive roller that drives said belt; and an idle roller, said sheet conveyer further comprising:

a drive member that drives said drive roller of said sheet conveying mechanism; and a power supply source that applies a power to said drive member, wherein the sheet conveyor is selectively detachable from the sheet tray so as to accommodate a second set of recording sheets different from a first set of recording sheets accommodated by the sheet tray.

16. The sheet conveyer according to claim 15, wherein said drive member drives said drive roller to transfer the recording sheets at a speed faster than a speed at which the recording sheets are ejected by said ejection mechanism.

17. A sheet conveyer which is provided to a data transmission and receiving apparatus having an ejection mechanism for ejecting a recording sheet recorded by said apparatus and a sheet tray for accommodating said ejected recording sheet, said sheet conveyer being mounted underneath said ejection mechanism of said apparatus, said sheet conveyer comprising a sheet conveying mechanism that conveys the recording sheet to an outside of said apparatus, wherein the sheet conveyor is selectively detachable from the sheet tray so as to accommodate a second set of recording sheets different from a first set of recording sheets accommodated by the sheet tray.

18. The sheet conveyer according to claim 17, wherein said sheet tray of said apparatus is detachably mounted, over said sheet conveying mechanism, on said data transmission and receiving apparatus.

19. The sheet conveyer according to claim 17, wherein said sheet conveying mechanism is detachable with respect to said sheet tray.

20. The sheet conveyer according to claim 17, wherein said sheet conveying mechanism conveys the recording sheet in a same direction as said ejection mechanism ejects the recording sheet.

21. The sheet conveyer according to claim 17, wherein said sheet conveying mechanism conveys the recording sheet in a different direction from a direction that said ejection mechanism ejects the recording sheet.

22. The sheet conveyer according to claim 17, wherein said sheet conveying mechanism, comprises:

a belt that conveys said recording sheet ejected by said ejection mechanism;

a drive roller that drives said belt; and an idle roller.

23. A sheet conveyer which is detachably provided to a data transmission and receiving apparatus having an ejection mechanism for ejecting a recording sheet recorded by said apparatus and a sheet tray for accommodating an ejected recording sheet, said sheet conveyer being mounted underneath said ejection mechanism and over said sheet tray of said apparatus, said sheet conveyer comprising:

a sheet conveying mechanism that conveys the recording sheet ejected by said ejection mechanism to a predetermined stack position;

a drive member that drives said sheet conveying mechanism;

an interface circuit that interfaces signals with a data transmission and receiving controller of said apparatus; and a controller that controls said drive member in accordance with said signals sent from said data transmission and receiving controller to start and to stop said sheet conveying mechanism, wherein the sheet conveyor is selectively detachable from the sheet tray so as to accommodate a second set of recording sheets different from a first set of recording sheets accommodated by the sheet tray.

24. The sheet conveyer according to claim 23, wherein said controller starts said sheet conveying mechanism in synchronism with an event that said data transmission and receiving controller receives a call from a source data terminal and stops said sheet conveying mechanism in synchronism with an event that said data transmission and receiving controller finishes a data receiving operation.

25. The sheet conveyer according to claim 23, wherein said controller starts said sheet conveying mechanism in synchronism with an event that said data transmission and receiving controller starts to receive an image signal from a source data terminal and stops said sheet conveying mechanism in synchronism with an event that said data transmission and receiving controller finishes a data receiving operation.

26. The sheet conveyer according to claim 23, wherein said controller starts said sheet conveying mechanism in synchronism with an event that a last recording sheet is ejected out of recording sheets on which entire data sent from a source data terminal in one communication session are recorded and said controller stops said sheet conveying mechanism in synchronism with an event that said sheet conveying mechanism conveys recording sheets stacked on said sheet conveying mechanism to a predetermined stack position.

27. The sheet conveyer according to claim 26, wherein said controller starts said sheet conveying mechanism in synchronism with a timing to stop a sheet ejection operation of said ejection mechanism.

28. The sheet conveyer according to claim 23, wherein said controller starts said sheet conveying mechanism in synchronism with one of the events, which ever occurs earlier, that said ejection mechanism completes and stops a sheet ejection operation and that a last recording sheet is ejected out of at least one of a predetermined number of said recording sheets and a predetermined height of a stack of said recording sheets and said controller stops said sheet conveying mechanism in synchronism with an event that said sheet conveying mechanism conveys said recording sheets stacked on said sheet conveying mechanism to a predetermined stack position.

29. A data transmission and receiving apparatus, comprising:

image recording means for recording an image on a recording sheet;

ejection means for ejecting a recording sheet recorded by said image recording means;

sheet accommodating means for accommodating said recording sheet ejected by said ejection means;

a sheet conveyer that is mounted underneath said ejection mechanism and over said sheet accommodating means, said sheet conveyer comprising:
a pair of frames;
a plurality of foot members mounted on a bottom surface of said pair of frames;
sheet conveying means held for rotation between said pair of frames, comprising:
a belt that conveys said recording sheet ejected by said ejection mechanism;

drive means for driving said belt; and
an idle roller,
source drive means for driving said drive means of said sheet conveying means; and
power supply means for applying a power to said source drive means, wherein the sheet conveyor is selectively detachable from the sheet accommodating means so as to accommodate a second set of recording sheets different from a first set of recording sheets accommodated by the sheet tray.

30. A data transmission and receiving apparatus, comprising:

image recording means for recording an image on a recording sheet;

ejection means for ejecting a recording sheet recorded by said image recording means;

sheet accommodating means for accommodating said ejected recording sheet; and a sheet conveyer that is detachably situated underneath said ejection means and over said sheet accommodating means and that includes sheet conveying means for conveying the recording sheet to an outside of said apparatus,, wherein the sheet conveyor is selectively detachable from the sheet accommodating means so as to accommodate a second set of recording sheets different from a first set of recording sheets accommodated by the sheet accommodating means.

31. A data transmission and receiving apparatus, comprising:

data transmission and receiving controlling means for controlling a data transmission and receiving operation;

image recording means for recording an image on a recording sheet;

ejection means for ejecting a recording sheet recorded by said image recording means;

sheet accommodating means for accommodating said recording sheet ejected by said ejection means; and a sheet conveyer detachably mounted underneath said ejection means and over said sheet accommodating means, comprising:
sheet conveying means for conveying the recording sheet ejected by said ejection means to a predetermined stack position;
source drive means for driving said sheet conveying means;
interface means for interfacing signals with said data transmission and receiving controlling means; and
drive controlling means for controlling said source drive means in accordance with said signals sent from said data transmission and receiving controlling means to start and to stop said sheet conveying means, wherein the sheet conveyor is selectively detachable from the sheet accommodating means so as to accommodate a second set of recording sheets different from a first set of recording sheets accommodated by the sheet accommodating means.

32. A sheet conveyer which is detachably provided to a data transmission and receiving apparatus having ejection means for ejecting a recording sheet recorded by said apparatus and a sheet accommodating means for accommodating an ejected recording sheet, said sheet conveyer being mounted underneath said ejection means and over said sheet accommodating means, said sheet conveyer comprising:

a pair of frames;

a plurality of foot members mounted on the bottom surface of said pair of frames;

sheet conveying means held for rotation between said pair of frames for conveying said recording sheet, comprising:
- a belt that conveys said recording sheet ejected by said ejection mechanism;
- drive means for driving said belt; and
- an idle roller, source drive means for driving said drive means of said sheet conveying mechanism; and power supply means for applying a power to said source drive means, wherein the sheet conveyor is selectively detachable from the sheet accommodating means so as to accommodate a second set of recording sheets different from a first set of recording sheets accommodated by the sheet accommodating means.

33. A sheet conveyer which is provided to a data transmission and receiving apparatus having ejection means for ejecting a recording sheet recorded by said apparatus and sheet accommodating means for accommodating said ejected recording sheet, said sheet conveyer being mounted underneath said ejection means and over said sheet tray of said apparatus, said sheet conveyer comprising sheet conveying means for conveying the recording sheet to an outside of said apparatus, wherein the sheet conveyor is selectively detachable from the sheet accommodating means so as to accommodate a second set of recording sheets different from a first set of recording sheets accommodated by the sheet accommodating means.

34. A sheet conveyer which is detachably provided to a data transmission and receiving apparatus having ejection means for ejecting a recording sheet recorded by said apparatus and a sheet accommodating means for accommodating an ejected recording sheet, said sheet conveyer being mounted underneath said ejection means and over said sheet accommodating means of said apparatus, said sheet conveyer comprising:

sheet conveying means for conveying the recording sheet ejected by said ejection means to a predetermined stack position;

source drive means for driving said sheet conveying means;

interface means for interfacing signals with a data transmission and receiving controller of said apparatus; and controlling means for controlling said source drive means in accordance with said signals sent from said data transmission and receiving controller to start and to stop said sheet conveying means, wherein the sheet conveyor is selectively detachable from the sheet accommodating means so as to accommodate a second set of recording sheets different from a first set of recording sheets accommodated by the sheet accommodating means.

* * * * *